US012364950B2

(12) United States Patent
Umeda et al.

(10) Patent No.: US 12,364,950 B2
(45) Date of Patent: Jul. 22, 2025

(54) CARBON DIOXIDE RECOVERY DEVICE

(71) Applicants: TOHO GAS CO., LTD., Nagoya (JP); NATIONAL UNIVERSITY CORPORATION TOKAI NATIONAL HIGHER EDUCATION AND RESEARCH SYSTEM, Nagoya (JP)

(72) Inventors: Yoshito Umeda, Nagoya (JP); Hiroshi Machida, Nagoya (JP); Koyo Norinaga, Nagoya (JP); Hiroshi Yamashita, Nagoya (JP); Tsuyoshi Yamaguchi, Nagoya (JP)

(73) Assignees: TOHO GAS CO., LTD., Nagoya (JP); NATIONAL UNIVERSITY CORPORATION TOKAI NATIONAL HIGHER EDUCATION AND RESEARCH SYSTEM, Nagoya (JP)

( * ) Notice: Subject to any disclaimer, the term of this patent is extended or adjusted under 35 U.S.C. 154(b) by 533 days.

(21) Appl. No.: 17/917,510

(22) PCT Filed: Apr. 26, 2021

(86) PCT No.: PCT/JP2021/016600
§ 371 (c)(1),
(2) Date: Oct. 6, 2022

(87) PCT Pub. No.: WO2021/221007
PCT Pub. Date: Nov. 4, 2021

(65) Prior Publication Data
US 2023/0149852 A1    May 18, 2023

(30) Foreign Application Priority Data

May 1, 2020    (JP) .................................. 2020-081158
Nov. 4, 2020    (JP) .................................. 2020-184456

(51) Int. Cl.
*B01D 53/62*    (2006.01)
*B01D 5/00*    (2006.01)
(Continued)

(52) U.S. Cl.
CPC ............ *B01D 53/62* (2013.01); *B01D 5/0036* (2013.01); *B01D 5/0057* (2013.01);
(Continued)

(58) Field of Classification Search
CPC .. B01D 5/0036; B01D 5/0057; B01D 5/0084; B01D 5/009; B01D 7/02; B01D 53/002;
(Continued)

(56) References Cited

U.S. PATENT DOCUMENTS

2004/0148961 A1    8/2004    Clodic et al.
2008/0031801 A1    2/2008    Lackner et al.
(Continued)

FOREIGN PATENT DOCUMENTS

CN    107019998 A    8/2017
CN    106237648 B    5/2018
(Continued)

OTHER PUBLICATIONS

Machine translation of JP2012184139 (Year: 2012).*
(Continued)

*Primary Examiner* — Brian A McCaig
(74) *Attorney, Agent, or Firm* — Oliff PLC

(57) ABSTRACT

A carbon dioxide recovery device provided with a separation device that separates carbon dioxide from to-be-separated gas (for example, combustion exhaust gas) containing carbon dioxide, wherein: in order from the upstream side where the to-be-separated gas is supplied, the separation device and carbon dioxide sublimators, which sublimate (solidify) carbon dioxide that was separated in the separation device, are connected in series, refrigerant circuits in which a fluid
(Continued)

having cold heat serves as the refrigerant, are connected to the carbon dioxide sublimators, and the refrigerant is used to sublimate (solidify) the carbon dioxide; and when the carbon dioxide is sublimated (solidified), the carbon dioxide sublimators are depressurized and set to negative pressure so as to draw in the carbon dioxide separated at the separation device.

18 Claims, 14 Drawing Sheets

(51) Int. Cl.
  *B01D 7/02* (2006.01)
  *B01D 53/00* (2006.01)
  *B01D 53/047* (2006.01)
  *B01D 53/14* (2006.01)
  *B01D 53/18* (2006.01)
  *B01D 53/22* (2006.01)
  *B01D 53/78* (2006.01)
  *C01B 32/50* (2017.01)
(52) U.S. Cl.
  CPC ............ *B01D 5/0084* (2013.01); *B01D 5/009* (2013.01); *B01D 7/02* (2013.01); *B01D 53/002* (2013.01); *B01D 53/047* (2013.01); *B01D 53/1425* (2013.01); *B01D 53/1475* (2013.01); *B01D 53/18* (2013.01); *B01D 53/22* (2013.01); *B01D 53/78* (2013.01); *C01B 32/50* (2017.08); *B01D 2257/504* (2013.01)
(58) Field of Classification Search
  CPC .............. B01D 53/047; B01D 53/1425; B01D 53/1475; B01D 53/18; B01D 53/22; B01D 53/62; B01D 53/78; B01D 2257/504; B01D 2258/0233; B01D 2258/025; C01B 32/50; F25J 3/061; F25J 3/067; F25J 2205/20; F25J 2205/24; F25J 2205/40; F25J 2205/50; F25J 2210/42; F25J 2210/50; F25J 2210/62; F25J 2210/66; F25J 2210/70; F25J 2270/904; Y02C 20/40; Y02P 20/151
  See application file for complete search history.

(56) References Cited

U.S. PATENT DOCUMENTS

| | | |
|---|---|---|
| 2008/0302133 A1 | 12/2008 | Saysset et al. |
| 2012/0174623 A1 | 7/2012 | Clodic et al. |

FOREIGN PATENT DOCUMENTS

| | | | | |
|---|---|---|---|---|
| CN | 110787596 A | | 2/2020 | |
| JP | 2004-532170 A | | 10/2004 | |
| JP | 2005-270814 A | | 10/2005 | |
| JP | 2009-520595 A | | 5/2009 | |
| JP | 2011-190117 A | | 9/2011 | |
| JP | 2012184139 A | * | 9/2012 | ............. C01B 31/20 |
| JP | 2013-501609 A | | 1/2013 | |

OTHER PUBLICATIONS

Nov. 14, 2023 Office Action issued in Chinese Patent Application No. 202180032312.9.
Apr. 19, 2024 extended Search Report issued in European Patent Application No. 21797064.9.
Jul. 6, 2021 International Search Report issued in Patent Application No. PCT/JP2021/016600.

\* cited by examiner

FIG. 8

| VOLUME RATIO | MASS RATIO OF CAPTURABLE LIQUID CARBON | MASS RATIO OF VAPORIZED CARBON DIOXIDE |
|---|---|---|
| 0.12 | 0.938 | 0.062 |
| 0.15 | 0.951 | 0.049 |
| 0.18 | 0.961 | 0.039 |
| 0.21 | 0.967 | 0.033 |
| 0.24 | 0.972 | 0.028 |
| 0.27 | 0.976 | 0.024 |
| 0.3 | 0.979 | 0.021 |

CARBON DIOXIDE RECOVERY DEVICE

CROSS-REFERENCE TO RELATED APPLICATIONS

This is a national phase application filed under 35 U.S.C. 371 of PCT/JP2021/016600 filed on Apr. 26, 2021, which claims the benefit of priority from the prior Japanese Patent Applications No. 2020-081158 filed on May 1, 2020 and No. 2020-184456 filed on Nov. 4, 2020, the entire contents of which are incorporated herein by reference.

TECHNICAL FIELD

The present invention relates to a carbon dioxide recovery device provided with a separation device for separating carbon dioxide from to-be-separated gas including the carbon dioxide.

BACKGROUND ART

In recent years, climate change issues have become an imminent problem, and thus there has been demanded to develop a technique of separating and recovering carbon dioxide from gas such as combustion exhaust gas including carbon dioxide so that emission of carbon dioxide into the atmosphere is avoided. Further, a demand for carbon dioxide such as carbon dioxide gas used for welding and dry ice for distribution has been increasing. Under a circumstance of delay in supply in response to this increasing demand, there is a tendency of yearly increase in an import amount of carbon dioxide in our country. However, when carbon dioxide is to be imported in a form of dry ice, a part of it could melt during transportation, resulting in huge loss in the amount. In this situation, there has been a demand for a device that can recover or capture carbon dioxide with high purity by utilizing carbon dioxide included in combustion exhaust gas and the like emitted in a power plant.

As a device for recovering carbon dioxide with high purity from the exhaust gas and the like, there has been known a carbon dioxide recovery device including an absorption tower to absorb carbon dioxide in an absorption liquid and a regeneration tower to diffuse carbon dioxide with vapor from the absorption liquid that has absorbed carbon dioxide as disclosed in the Patent Document 1.

In the regeneration tower, the absorption liquid that has absorbed carbon dioxide is heated to a boiling temperature to perform diffusion of carbon dioxide and vapor. In order to suppress an amount of energy consumption for this heating, in the Patent Document 1, the regeneration tower is depressurized to lower the boiling temperature of the absorption liquid having absorbed the carbon dioxide for energy saving.

RELATED ART DOCUMENTS

Patent Documents

Patent Document 1: JP2005-270814A

SUMMARY OF INVENTION

Problems to be Solved by the Invention

However, the above conventional technique has the following problem.

The carbon dioxide recovery device disclosed in the Patent Document 1 uses a vacuum pump for depressurizing the regeneration tower. Operation of this vacuum pump requires a large amount of electric power, and thus there is a concern about increase in electric power cost and generation of further carbon dioxide for power generation. To address this, there has been a demand for a carbon dioxide recovery device which can achieve further energy saving in order to suppress increase in the electric power cost and generation of further carbon dioxide for power generation.

The present invention has been made to provide a carbon dioxide recovery device that can recover carbon dioxide while achieving further energy saving.

Means of Solving the Problems

To achieve the above purpose, a carbon dioxide recovery device according to one aspect of the present invention has the following configuration.

The carbon dioxide recovery device has the feature that the device comprising a separation device to separate carbon dioxide from to-be-separated gas including the carbon dioxide, wherein the separation device and a carbon dioxide desublimator to desublimated (solidify) the carbon dioxide having been separated by the separation device are connected in series in order from an upstream side of supplying the to-be-separated gas, the carbon dioxide desublimator is connected with a refrigerant circuit in which a fluid having cold heat is utilized as a refrigerant, and the carbon dioxide is desublimated (solidified) by the refrigerant, and when the carbon dioxide is desublimated (solidified), the carbon dioxide desublimator is depressurized to be under negative pressure so that the carbon dioxide having been separated by the separation device is sucked.

According to the above-mentioned carbon dioxide recovery device, the separation device of separating the carbon dioxide from the to-be-separated gas and emitting the separated carbon dioxide and the carbon dioxide desublimator of desublimating (solidifying) the carbon dioxide are connected in series. The carbon dioxide separated by the separation device is emitted from the separation device and then flows to the carbon dioxide desublimator. The carbon dioxide having reached the carbon dioxide desublimator is cooled down by the refrigerant, which utilizes the fluid having the cold heat, and is then desublimated (solidified). Dry ice generated by this desublimation (solidification) of the carbon dioxide is recovered by desublimation (gasification) again, and thus the carbon dioxide can be utilized as carbon dioxide gas or the like.

When the carbon dioxide is to be desublimated (solidified), the carbon dioxide desublimator is depressurized to be under the negative pressure. The carbon dioxide emitted from the separation device is sucked by this negative pressure. This suction causes flow of the carbon dioxide from the separation device to the carbon dioxide desublimator, so that desublimation (solidification) of the carbon dioxide in the carbon dioxide desublimator is promoted. Suction of the carbon dioxide is performed by utilizing the fluid having the cold heat, and thus a pump or the like for suction is not necessary and energy conservation can be achieved. This energy conservation further achieves suppression in the increase in electric power cost and achieves suppression in the generation of further carbon dioxide for power generation.

As the fluid having the cold heat, there are provided for example, liquefied fuel and liquefied gas. The liquefied fuel is, for example, liquefied natural gas (LNG), liquid hydrogen, liquefied methane, and others. Natural gas as main material for city gas is imported in a form of LNG and then re-gasified in an LNG terminal and shipped by a gas pipeline. In regasification of the LNG, a large amount of cold heat energy is released, and this cold heat energy has attracted attention as unused energy. Accordingly, as mentioned above, utilizing the cold heat of the liquefied fuel for suction of the carbon dioxide results in good use of unused energy, so that a carbon dioxide recovery device can be made ecological. Herein, as the liquefied fuel, liquid hydrogen can be given other than the LNG. Further, the liquefied gas is, for example, exemplified as liquid nitrogen and liquid oxygen. Furthermore, the fluid having the cold heat is not necessarily in a form of liquid but may be gas, slurry, and gas-liquid multiphase flow.

Effects of the Invention

The carbon dioxide recovery device according to the present invention has the above-mentioned configuration, and thus can achieve recovery of carbon dioxide while saving energy.

BRIEF DESCRIPTION OF THE DRAWINGS

FIG. 8 is a chart showing a mass ratio of recoverable liquefied carbon dioxide and a mass ratio of gasified carbon dioxide relative to a mass of dry ice for each of predetermined volume ratio;

MODE FOR CARRYING OUT THE INVENTION

First Embodiment

Firstly, a first embodiment of a carbon dioxide recovery device of the present invention is explained in detail with reference to the accompanying drawings.

Figure 1:
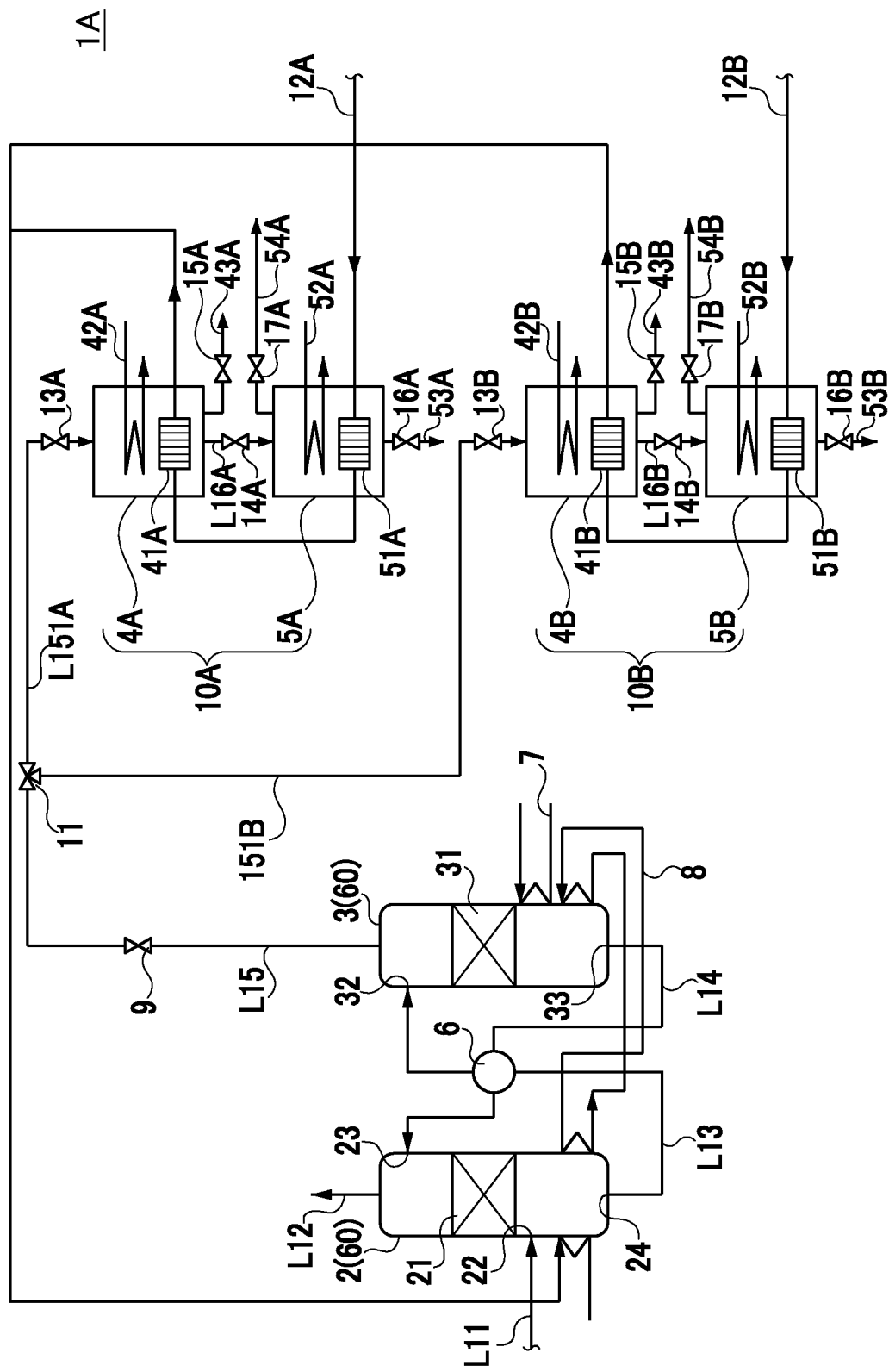
FIG. 1 is a schematic view showing a configuration of a carbon dioxide recovery device according to a first embodiment.

FIG. 1 is a schematic view showing a configuration of a carbon dioxide recovery device 1A according to the first embodiment. The carbon dioxide recovery device 1A is provided with, as shown in FIG. 1, a separation device 60, water vapor condensers 4A, 4B, and carbon dioxide desublimators 5A, 5B.

The separation device 60 is configured with an absorption tower 2 and a regeneration tower 3. The absorption tower 2 is, for example, a countercurrent gas-liquid contact device and is filled inside with a filler 21 such as Raschig ring.

Further, the absorption tower 2 is provided with a gas introduction port 22 below the filler 21, and to the gas introduction port 22, a gas supply passage L11 is connected. Combustion exhaust gas (one example of to-be-separated gas), which is for example generated in a power plant, an iron manufacturing plant, and a cement plant, is supplied from the gas supply passage L11 to the absorption tower 2. As the to-be-separated gas, the gas is not limited to the combustion exhaust gas but may be in the atmosphere. Other than that, biogas may be used, and off-gas including carbon dioxide generated from a heat treatment furnace such as a carburizing furnace and a chemical reaction device may be used.

The combustion exhaust gas includes carbon dioxide in its about 10 to 20% and also includes nitrogen, oxygen, and others. The combustion exhaust gas is considered to include sulfur oxide, and thus a desulfurization unit may be provided on the gas supply passage L11 so that the combustion exhaust gas that has been removed with the sulfur oxide is supplied to the absorption tower 2.

The absorption tower 2 is further provided with an absorption liquid introduction port 23 above the filler 21 to introduce the absorption liquid (lean liquid). As the absorption liquid, amino-based solvents and physical absorption liquid may be adapted. There are raised examples of amine as Monoethanolamine (MEA), Diethanolamine (DEA), Triethanolamine (TEA), Diethylethanolamine (DEEA), Diisopropylamine (DIPA), Aminoethoxyethanol (AEE), and Methyl diethanolamine (MDEA). There are raised examples of the physical absorption liquid as a derivative of chemical compound and Cycloetramethylene Sulfone (Sulfolane), aliphatic acid amide, NMP (N-Methyl-2-pyrrolidone), N-Alkylated 2-Pyrrolidone and corresponding Piperidone, and dialkyl-ether-group mixture of methanol and polyethylene glycol.

However, the most preferable one of the absorption liquid is amine solvent in which 2-(Ethylamino) ethanol and Diethylene Glycol Monoethyl Ether are mixed to have amine concentration of about 30% (hereinafter, referred as amine solvent according to the present embodiment). Application of the amine solvent according to the present embodiment achieves further efficient regeneration of the absorbed carbon dioxide as compared with conventionally known amine solvent (MEA solvent mixed to have about 30% of the amine concentration, which is hereinafter referred as a conventional solvent).

Figure 11:
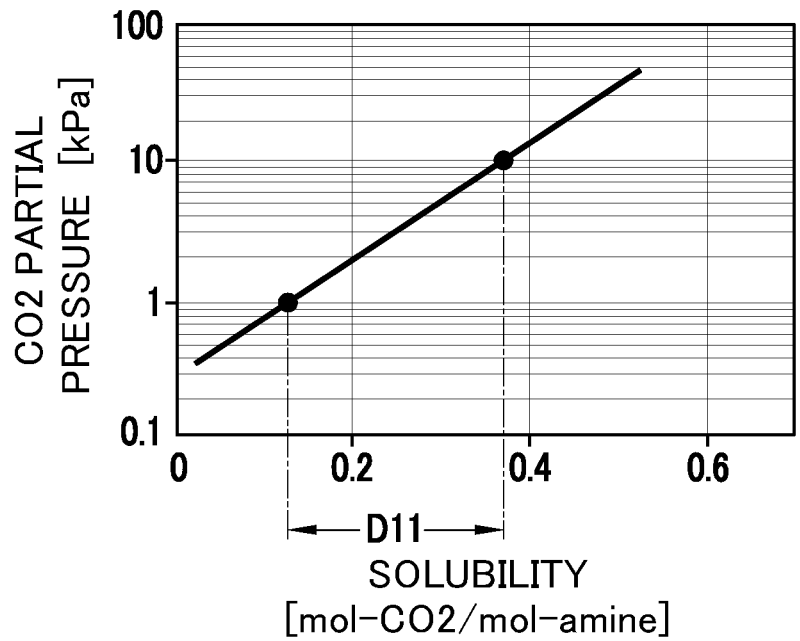
FIG. 11 is a graph showing solubility of the carbon dioxide in amine solution according to the present embodiments.
Figure 12:
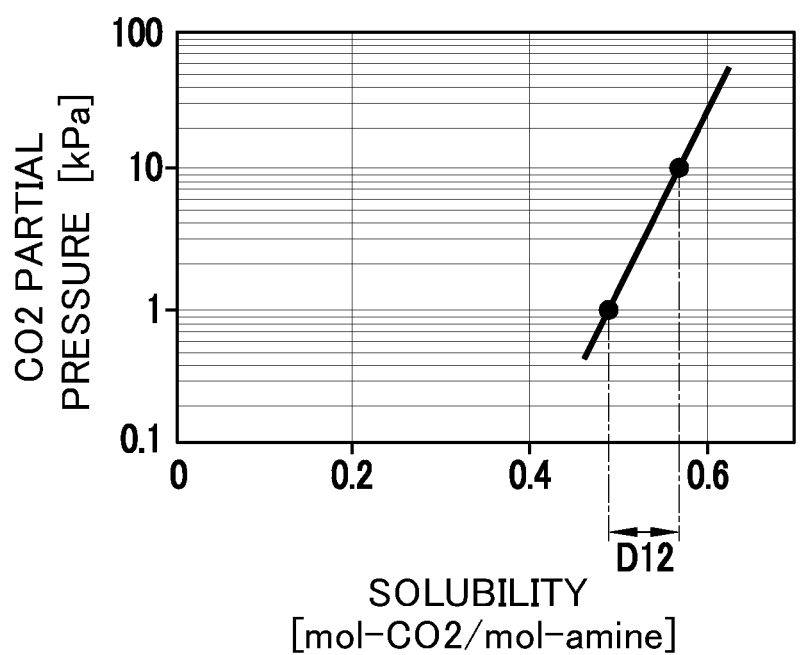
FIG. 12 is a graph showing the solubility of the carbon dioxide in a conventional solution.

FIG. 11 is a graph showing a solubility of carbon dioxide in the amine solvent according to the present embodiment, and FIG. 12 is a graph showing the solubility of the carbon dioxide according to the conventional liquid. Both graphs of FIGS. 11 and 12 illustrate the solubility under the atmosphere of 40 degrees centigrade.

For example, when a pressure at the time of absorbing the carbon dioxide is set as 10 kPa and the pressure at the time of regenerating the absorbed carbon dioxide is set as 1 kPa, as shown in FIG. 11 and FIG. 12, the amine solvent according to the present embodiment has a solubility gap D11 of carbon dioxide between the time of absorbing and the time of regenerating as about 0.25 (mol-$CO_2$/mol-amine), and the conventional solvent has a solubility gap D12 between absorbing and regenerating as about 0.08 (mol-$CO_2$/mol-amine). The bigger this solubility gap becomes, the more a regeneration amount of carbon dioxide becomes. The amine solvent according to the present embodiment has the solubility gap D11 about three times as large as the solubility gap D12 of the conventional solvent, and thus the amine solvent according to the present embodiment can perform regeneration of the absorbed carbon dioxide more efficiently than the conventional solvent.

The combustion exhaust gas supplied from the gas introduction port 22 to the absorption tower 2 ascends inside the absorption tower 2, and absorption liquid (lean liquid) introduced from the absorption liquid introduction port 23 to the absorption tower 2 falls down toward the filler 21. Further, the combustion exhaust gas supplied to the absorption tower 2 also goes up toward the filler 21. Thus, the absorption liquid (the lean liquid) is brought into a gas-liquid contact with the combustion exhaust gas while the liquid is falling down along a surface of the filler 21, so that the liquid selectively absorbs carbon dioxide in the combustion exhaust gas. The combustion exhaust gas (nitrogen and oxygen) that has been removed with carbon dioxide is discharged through a discharge passage L12 which is connected to a top portion of the absorption tower 2, and the absorption liquid (the lean liquid) which has absorbed the carbon dioxide is discharged from a discharge port 24 on a bottom part of the absorption tower 2. The discharge port 24 of the absorption tower 2 is connected with one end of a take-out pipe L13, and the other end of the take-out pipe L13 is connected to the regeneration tower 3. The absorption liquid (the lean liquid) discharged to the take-out pipe L13 from the absorption tower 2 passes through a heat exchanger 6 and then is transferred to the regeneration tower 3.

The regeneration tower 3 is for example a countercurrent gas-liquid contact device and is filled inside with a filler 31 such as Raschig ring.

The regeneration tower 3 is provided with an absorption liquid introduction port 32 connected with the take-out pipe L13 above the filler 31, and the absorption liquid (rich liquid) transferred from the absorption liquid introduction port 32 through the take-out pipe L13 is supplied. The absorption liquid (the rich liquid) supplied from the absorption liquid introduction port 32 falls down to the filler 31.

The absorption liquid (the rich liquid) is heated to reach a boiling temperature while the liquid is falling down in the regeneration tower, so that the liquid diffuses carbon dioxide with water vapor. Heating of the absorption liquid (the rich liquid) is, for example, performed by a heat pump 7 utilizing waste heat and ambient heat or a heat pump 8 utilizing heat generated when the absorption liquid (the lean liquid) absorbs carbon dioxide in the absorption tower 2. Inside the regeneration tower 3 is depressurized to about 4 kPa (which will be explained in detail later), for example, and thus the boiling temperature is lowered (the boiling temperature of water is about 29 degrees under a circumstance of about 4 kPa). Accordingly, energy consumption for heating the absorption liquid (the rich liquid) can be suppressed.

The absorption liquid (the lean liquid) that has diffused the carbon dioxide is discharged from a discharge port 33 on a bottom part of the regeneration tower 3. The absorption liquid (the lean liquid) that has been discharged to a take-out pipe L14 from the regeneration tower 3 passes through the heat exchanger 6 and is then returned to the absorption tower 2. The take-out pipe L14 is connected with the absorption liquid introduction port 23 of the absorption tower 2, and thus the absorption liquid (the lean liquid) that has been returned to the absorption tower 2 falls down to the filler 21 to be reused for absorbing the carbon dioxide. Further, the carbon dioxide and the water vapor which have been diffused are discharged to a first transfer pipe L15 from a top portion of the regeneration tower 3. This discharge operation is performed by sucking the carbon dioxide and the water vapor by use of negative pressure generated in the carbon dioxide desublimators 5A, 5B (the negative pressure generated in the carbon dioxide desublimators 5A, 5B will be explained later).

The first transfer pipe L15 is branched into a branch transfer pipe L151A and a branch transfer pipe L151B by a switching valve 11. Through this branching, a carbon dioxide recovery line 10A configured with a water vapor condenser 4A and the carbon dioxide desublimator 5A which are connected in series and a carbon dioxide recovery line 10B configured with a water vapor condenser 4B and the carbon dioxide desublimator 5B which are connected in series are connected in parallel to the regeneration tower 3. Then, operation of the switching valve 11 allows selection of flow of the carbon dioxide and the water vapor which are discharged from the regeneration tower 3 to either one of the carbon dioxide recovery lines 10A and 10B.

A configuration of the carbon dioxide recovery line 10A (10B) is explained in detail. The regeneration tower 3 is connected to the water vapor condenser 4A (4B) via the first transfer pipe L15 and the branch transfer pipe L151A (L151B). Herein, the branch transfer pipe L151A (L151B) is provided with an open-close valve 13A (13B) between the switching valve 11 and the water vapor condenser 4A (4B).

The water vapor condenser 4A (4B) is provided inside with a heat exchanger 41A (41B). The heat exchanger 41A is used for cooling the water vapor and the carbon dioxide inside the condenser by a refrigerant flowing through a refrigerant circuit 12A (12B) which will be explained later. The water vapor condenser 4A (4B) is further connected with a heat pump 42A (42B) utilizing waste heat and ambient heat and a drain 43A (43B). The drain 43A (43B) is provided with an open-close valve 15A (15B).

Further, the water vapor condenser 4A (4B) is connected to the carbon dioxide desublimator 5A (5B) via a second transfer pipe L16A (L16B). Herein, the second transfer pipe L16A (L16B) is provided with an open-close valve 14A (14B) between the water vapor condenser 4A (4B) and the carbon dioxide desublimator 5A (5B).

The carbon dioxide desublimator 5A (5B) is provided with a heat exchanger 51A (51B) inside. The heat exchanger 51A (51B) is used for cooling the carbon dioxide in the desublimator by the refrigerant flowing through the refrigerant circuit 12A (12B) which will be explained later. The carbon dioxide desublimator 5A (5B) is further connected with a heat pump 52A (52B) utilizing the waste heat and the ambient heat, a drain 53A (53B), and a take-out pipe 54A (54B). The drain 53A (53B) is provided with an open-close valve 16A (16B), and the take-out pipe 54A includes an open-close valve 17A (17B).

Further, the carbon dioxide recovery lines 10A, 10B are configured with the refrigerant circuits 12A, 12B, respectively so that the refrigerant flows in an order of the carbon dioxide dedesublimators 5A, 5B, and the water vapor condensers 4A, 4B. Moreover, the refrigerant circuits 12A, 12B are integrated after passing the water vapor condensers 4A, 4B so that the refrigerant having flown through the water vapor condensers 4A, 4B further flows into the absorption tower 2. As the refrigerant, cold heat after regasification of liquefied fuel (one example of a fluid) is used. The liquefied fuel is, for example, liquefied natural gas, liquid hydrogen, liquefied methane, and others. For example, the cold heat after regasification of the liquefied gas may be used as the refrigerant. The liquefied gas is, for example, exemplified as liquid nitrogen, liquid oxygen, and others.

The function of the refrigerant, the water vapor condenser 4A (4B), and the carbon dioxide desublimator 5A (5B) in the above-configured carbon dioxide recovery device 1 is explained below.

The refrigerant passes through the refrigerant circuit 12A (12B) to firstly be cooled inside the carbon dioxide desublimator 5A (5B) by the heat exchanger 51A (51B) of the carbon dioxide desublimator 5A (5B). When liquefied natural gas is used as the liquefied fuel, the cold heat is minus 162 degrees centigrade, and when liquid hydrogen is used, the cold heat is minus 253 degrees centigrade. The temperature inside the carbon dioxide desublimator 5A (5B) is however cooled to a temperature appropriate for desublimation (solidification) of the carbon dioxide by controlling a temperature gap by the heat exchanger 51A (51B) or by utilizing a separate operation medium or a refrigerant. For example, when combustion exhaust gas from an iron manufacturing plant or a cement plant is used as the to-be-separated gas, the temperature inside the carbon dioxide desublimator 5A (5B) is preferably cooled to about minus 85 degrees centigrade or below. Further, when the combustion exhaust gas from a power plant is used as the to-be-separated gas, the temperature inside the carbon dioxide desublimator 5A (5B) is preferably cooled to about minus 96 degrees centigrade or below. Furthermore, when the atmosphere is used as the to-be-separated gas, the temperature inside the carbon dioxide desublimator 5A (5B) is preferably cooled to about minus 140 degrees centigrade or below.

Figure 15:
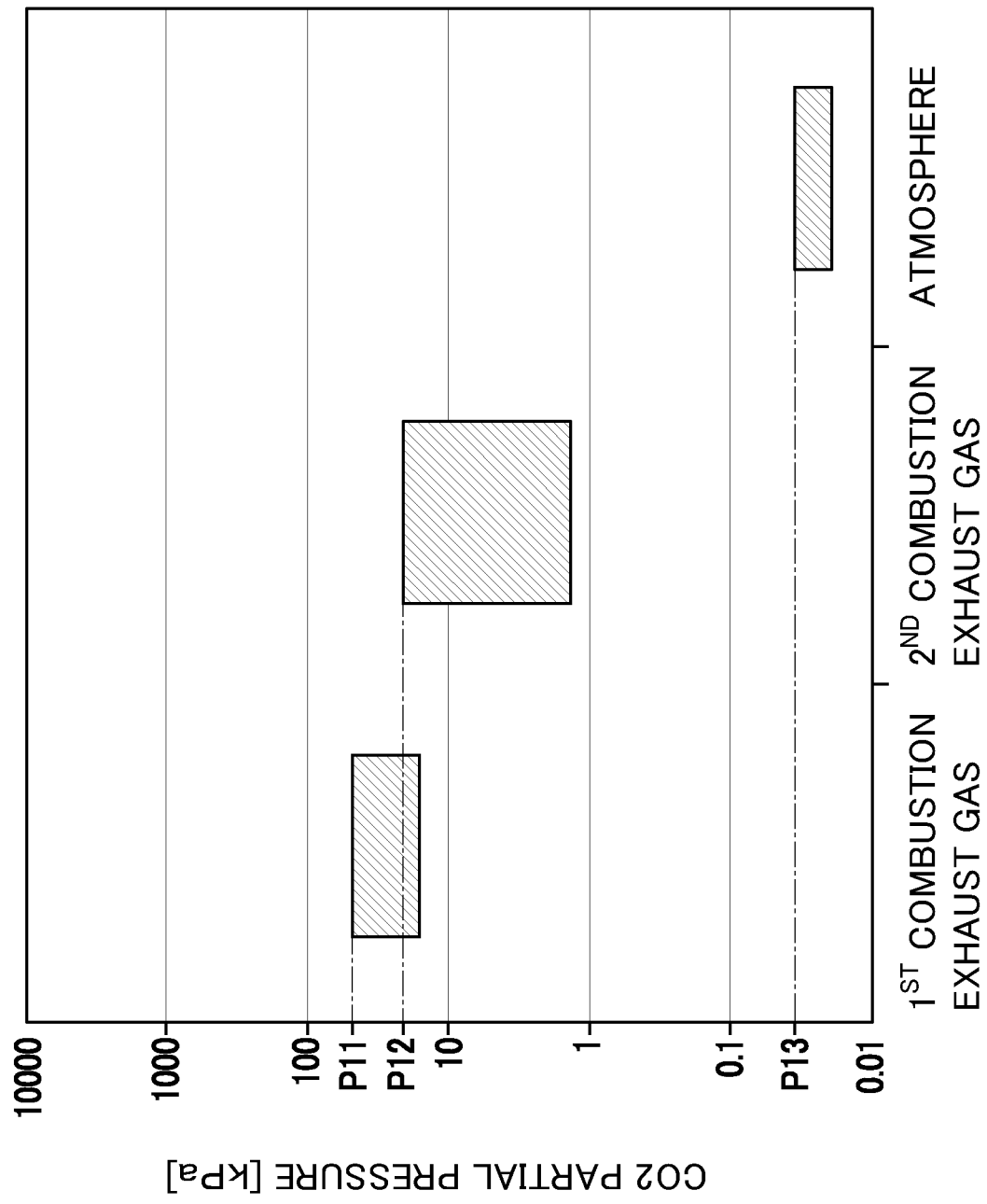
FIG. 15 is a graph showing a range of partial pressure values of the carbon dioxide for each type of to-be-separated gas.

The temperature appropriate for desublimation (solidification) of the carbon dioxide inside the carbon dioxide desublimator 5A (5B) varies depending on a type of the to-be-separated gas because a partial pressure of the carbon dioxide in the to-be-separated gas is different according to the type of the to-be-separated gas. Herein, FIG. 15 is a graph showing a range of partial pressure values of carbon dioxide in the combustion exhaust gas (represented as a first combustion exhaust gas in FIG. 15) from the iron manufacturing plant or the cement plant, the combustion exhaust gas (represented as a second combustion exhaust gas in FIG. 15) from the power plant, and in the atmosphere.

For example, the maximum partial pressure P11 of the carbon dioxide in the combustion exhaust gas from the iron manufacturing plant or the cement plant is about 60 kPa. Then, the temperature corresponding to this partial pressure P11 at which the carbon dioxide is in a gas-solid balanced state is about minus 85 degrees centigrade. Therefore, when the combustion exhaust gas from the iron manufacturing plant or the cement plant is used as the to-be-separated gas, in order to desublimate (solidify) the carbon dioxide, it is preferable to cool it inside the carbon dioxide desublimator 5A (5B) to the temperature of about minus 85 degrees centigrade or below.

Further for example, the maximum partial pressure P12 of the carbon dioxide in the combustion exhaust gas from the power plant is about 21 kPa. Then, the temperature corresponding to this partial pressure P12 at which the carbon dioxide is in the gas-solid balanced state is about minus 96 degrees centigrade. Accordingly, when the combustion exhaust gas from the power plant is used as the to-be-separated gas, in order to desublimate (solidify) the carbon dioxide, it is preferable to cool it inside the carbon dioxide desublimator 5A (5B) to the temperature of about minus 96 degrees centigrade or below.

Further for example, the maximum partial pressure P13 of the carbon dioxide in the atmosphere is about 0.045 kPa. Then, the temperature corresponding to this partial pressure P13 at which the carbon dioxide is in the gas-solid balanced state is about minus 140 degrees centigrade. Accordingly, when the atmosphere is used as the to-be-separated gas, in order to desublimate (solidify) the carbon dioxide, it is preferable to cool it inside the carbon dioxide desublimator 5A (5B) to the temperature of about minus 140 degrees centigrade or below.

Cooling down the temperature inside the carbon dioxide desublimator 5A (5B) to the temperature appropriate for desublimation (solidification) of the carbon dioxide causes desublimation (solidification) of the carbon dioxide in the carbon dioxide desublimator 5A (5B) to form dry ice. The MEA solvent that has remained in desublimation (solidification) is discharged from the drain 53A (53B) by opening the open-close valve 16A (16B). Further, when the carbon dioxide that has turned dry ice is to be recovered, the open-close valve 17A (17B) is opened to bring the carbon dioxide desublimator 5A (5B) back to the normal temperature so that the dry ice is desublimated (gasified) and recovered from the take-out pipe 54A (54B). At this time, the open-close valves 14A (14B), 16A (16B) are in a valve-closed state so that the desublimated (gasified) carbon dioxide would not flow in any parts other than the take-out pipe 54A (54B). Then, the thus recovered carbon dioxide is utilized as carbon dioxide gas or the like.

When the carbon dioxide is to be recovered, desublimation (solidification) of the carbon dioxide in the carbon dioxide desublimators 5A, 5B needs to be interrupted. However, as mentioned above, it is selectable to make frow the carbon dioxide and the water vapor that are discharged from the regeneration tower 3 into either one of the carbon dioxide recovery lines 10A, 10B. Accordingly, while the carbon dioxide is recovered from the carbon dioxide desublimator 5A of the one carbon dioxide recovery line 10A, the carbon dioxide desublimator 5B of the other carbon dioxide recovery line 10B can continuously desublimate (solidify) the carbon dioxide. Thus, the carbon dioxide can be further efficiently recovered.

When desublimation (solidification) of the carbon dioxide is performed in the carbon dioxide desublimator 5A (5B), the carbon dioxide desublimator 5A (5B) is depressurized to be under negative pressure. Thereby, the carbon dioxide desublimator 5A (5B) functions as a pump to perform suction of the water vapor and the carbon dioxide that have been diffused in the regeneration tower 3. This suction creates flow of the water vapor and the carbon dioxide toward the carbon dioxide recovery line 10A (10B).

Further, in accordance with depressurizing of the carbon dioxide desublimator 5A (5B), the regeneration tower 3 connected in series is also depressurized, so that a boiling temperature of the absorption liquid in the regeneration tower 3 is lowered. Accordingly, consumption energy for heating the absorption liquid can be suppressed. In the present embodiment, the regeneration tower 3 is depressurized to about 4 kPa as mentioned above. The pressure of the regeneration tower 3 is adjusted by a decompression valve 9 provided on the first transfer pipe L15.

After cooling inside the carbon dioxide desublimator 5A (5B), the refrigerant subsequently is cooled inside the water vapor condenser 4A (4B) by the heat exchanger 41A (41B) provided in the water vapor condenser 4A (4B). The refrigerant has been raised its temperature by heat exchanging in the heat exchanger 51A (51B), so that the refrigerant is cooled to about 1 degree centigrade.

Since the water vapor condenser 4A (4B) is about 1 degree centigrade, the carbon dioxide and the water vapor which are sucked by the negative pressure generated in the carbon dioxide desublimator 5A (5B) and thus discharged from the regeneration tower 3 are made to flow into the water vapor condenser 4A (4B) to be cooled down to about 20 degrees centigrade. Thereby, the water vapor is condensed to become water. The water is stored on a bottom part of the water vapor condenser 4A (4B), and the thus stored water is discharged through the drain 43A (43B) by opening the open-close valve 15A (15B). Herein, the drain 43A (43B) may be connected to the regeneration tower 3 to reuse the water in the regeneration tower 3.

The carbon dioxide that has flown with the water vapor in the water vapor condenser 4A (4B) remains as gaseous body in a temperature of about 20 degrees centigrade, and accordingly, the carbon dioxide is sucked by the carbon dioxide desublimator 5A (5B) so that the carbon dioxide passes through the second transfer pipe L16A (L16B) and flows in the carbon dioxide desublimator 5A (5B). Then, the carbon dioxide having flown into the carbon dioxide desublimator 5A (5B) is desublimated (solidified) to become dry ice as mentioned above.

Subsequently, the refrigerant is used for cooling the absorption tower 2 after cooling inside the water vapor condenser 4A (4B). An object of cooling the absorption tower 2 is to restrain temperature increase in the absorption tower 2 due to heat generation that is caused when the absorption liquid absorbs the carbon dioxide.

As mentioned above, the carbon dioxide recovery device 1A according to the first embodiment comprises the separation device 60 to separate carbon dioxide from the to-be-separated gas including the carbon dioxide, wherein the separation device 60 and the carbon dioxide desublimators 5A, 5B to desublimate (solidify) the carbon dioxide, which has been separated by the separation device, are connected in series in order from an upstream side of supplying the to-be-separated gas. The carbon dioxide desublimators 5A, 5B are connected with the refrigerant circuits 12A, 12B in which a fluid having the cold heat is utilized as the refrigerant, and the carbon dioxide is desublimated (solidified) by the refrigerant, and when the carbon dioxide is desublimated (solidified), the carbon dioxide desublimators 5A, 5B are depressurized to be under negative pressure so that the carbon dioxide that has been separated by the separation device 60 is sucked.

According to the above-mentioned carbon dioxide recovery device 1A, the separation device 60 for separating the carbon dioxide from the to-be-separated gas and emitting the separated carbon dioxide and the carbon dioxide desublimators 5A, 5B for desublimating (solidifying) the carbon dioxide are connected in series. The carbon dioxide separated by the separation device 60 is emitted from the separation device 60 and then flows to the carbon dioxide desublimators 5A, 5B. The carbon dioxide having reached the carbon dioxide desublimators 5A, 5B is cooled down by the refrigerant, which utilizes the fluid having the cold heat, and then desublimated (solidified). Dry ice generated by this desublimation (solidification) of the carbon dioxide is recovered by desublimating (solidification) again, and thus the carbon dioxide can be utilized as carbon dioxide gas or the like.

When the carbon dioxide is to be desublimated (solidified), the carbon dioxide desublimators 5A, 5B are depressurized to be under the negative pressure. The carbon dioxide emitted from the separation device 60 is sucked by this negative pressure. This suction causes flow of the carbon dioxide from the separation device 60 to the carbon dioxide desublimators 5A, 5B, so that desublimation (solidification) of the carbon dioxide in the carbon dioxide desublimators 5A, 5B are promoted. Suction of the carbon dioxide is performed by utilizing the fluid having the cold heat, and thus a pump or the like for suction is not necessary and energy conservation can be achieved. This energy conservation further achieves suppression in increase in electric power cost and suppression in generation of further carbon dioxide for power generation.

As the fluid having the cold heat, there are provided for example, liquefied fuel and liquefied gas. The liquefied fuel is, for example, liquefied natural gas (LNG), liquid hydrogen, liquefied methane, and others. Natural gas as main material for city gas is imported in a form of LNG and then re-gasified in an LNG terminal and shipped by a gas pipeline. In regasification of the LNG, a large amount of cold heat energy is released, and thus the cold heat energy has attracted attention as unused energy. Accordingly, as mentioned above, utilizing the cold heat of the liquefied fuel for suction of the carbon dioxide results in good use of unused energy, so that a carbon dioxide recovery device can be made ecological. Herein, as the liquefied fuel, liquid hydrogen can be given other than the LNG. Further, the liquefied gas is, for example, liquid nitrogen and liquid oxygen. Furthermore, the fluid having the cold heat is not necessarily in a form of liquid but may be gas, slurry, and gas-liquid multiphase flow.

Further, the carbon dioxide recovery device 1A according to the first embodiment is configured such that the separation device 60 is provided with the absorption tower 2 to bring to-be-separated gas including carbon dioxide and the absorbing liquid for absorbing the carbon dioxide into gas-liquid contact to absorb the carbon dioxide by the absorbing liquid and the regeneration tower 3 configured to emit the carbon dioxide with the water vapor from the absorbing liquid that has absorbed the carbon dioxide. The regeneration tower 3, the water vapor condensers 4A, 4B to condense the water vapor that has been emitted in the regeneration tower 3, the carbon dioxide desublimators 5A, 5B to desublimate (solidify) the carbon dioxide that has been emitted in the regeneration tower are successively connected in series. The water vapor condensers 4A, 4B and the carbon dioxide desublimators 5A, 5B are connected to the refrigerant circuits 12A, 12B using the fluid having the cold heat as the refrigerant, and the water vapor is condensed and the carbon dioxide is desublimated (solidified) by the refrigerant. The water vapor condensers 4A, 4B and the carbon dioxide desublimators 5A, 5B are depressurized to be under negative pressure when the water vapor is condensed and the carbon dioxide is desublimated (solidified), so that the water vapor and the carbon dioxide both having been emitted in the regeneration tower 3 are sucked.

According to the above-mentioned carbon dioxide recovery device 1A, the regeneration tower 3, the water vapor condensers 4A, 4B, and the carbon dioxide desublimators 5A, 5B are successively connected in series, and therefore, the carbon dioxide and the water vapor having been emitted in the regeneration tower 3 firstly flow in the water vapor condensers 4A, 4B and only the water vapor is cooled by the refrigerant utilizing the fluid having the cold heat and condensed in the water vapor condensers 4A, 4B. Then, only the carbon dioxide flows into the subsequent carbon dioxide desublimators 5A, 5B. The carbon dioxide having reached the carbon dioxide desublimators 5A, 5B is cooled by the refrigerant utilizing the fluid having the cold heat and desublimated (solidified). The dry ice generated by desublimating (solidifying) this carbon dioxide is recovered by desublimating (gasifying) again so as to be made good use of as the carbon dioxide gas or the like.

When the carbon dioxide is desublimated (solidified), the water vapor condensers 4A, 4B and the carbon dioxide desublimators 5A, 5B are depressurized to be under the negative pressure. By this negative pressure, the water vapor and the carbon dioxide having been emitted in the regeneration tower 3 are sucked, so that the water vapor is made to flow from the regeneration tower 3 to the water vapor condensers 4A, 4B and the carbon dioxide is made to flow from the regeneration tower 3 through the water vapor condensers 4A, 4B to the carbon dioxide desublimators 5A, 5B.

In accordance with depressurizing of the water vapor condensers 4A, 4B and the carbon dioxide desublimators 5A, 5B, the regeneration tower 3 connected in series is also depressurized, so that the boiling temperature of the absorbing liquid (amine-based solvents) in the regeneration tower 3 is lowered. Therefore, it is possible to suppress the energy consumption for heating the absorbing liquid (amine-based solvents).

Further, depressurizing of the regeneration tower 3 is made by utilizing the fluid having the cold heat, and thus electric power for depressurizing the regeneration tower 3 is unnecessary, thereby achieving energy conservation. The achievement in the energy conservation further achieves suppression of further generation of carbon dioxide for power generation.

Further, the carbon dioxide recovery device 1A according to the first embodiment is configured such that the refrigerant circuits 12A, 12B are connected as being communicated with the carbon dioxide desublimators 5A, 5B, the water vapor condensers 4A, 4B, and the absorption tower 2. The refrigerant flows through the carbon dioxide desublimators 5A, 5B, the water vapor condensers 4A, 4B, and the absorption tower 2 in this order.

According to the above-mentioned carbon dioxide recovery device 1A, the refrigerant of the fluid having the cold heat that has been utilized for desublimation (solidification) of the carbon dioxide can be further used for condensation of the water vapor and used for cooling the absorption tower 2 thereafter. The absorption tower 2 is cooled down for the purpose of suppressing the temperature increase in the absorption tower 2 which is heated by the heat generated when the absorbing liquid (amine-based solvents) absorbs the carbon dioxide.

Further, the carbon dioxide recovery device 1A according to the first embodiment is configured such that the regeneration tower 3 is connected in parallel with at least the two carbon dioxide recovery lines 10A, 10B configured with the water vapor condensers 4A, 4B and the carbon dioxide desublimators 5A, 5B which are connected in series. Accordingly, it is possible to further efficiently recover the carbon dioxide.

In the carbon dioxide desublimators 5A, 5B, dry ice, which is the desublimated (solidified) carbon dioxide, needs to be recovered by regasification or the like, and thus in recovery, desublimation (solidification) of the carbon dioxide needs to be interrupted. To address this, the regeneration tower 3 is connected in parallel with at least the two carbon dioxide recovery lines 10A, 10B configured with the water vapor condensers 4A, 4B and the carbon dioxide desublimators 5A, 5B which are connected in series, and accordingly, while one of the carbon dioxide recovery lines 10A, 10B is recovering the dry ice by desublimating (gasifying) the dry ice again through the carbon dioxide desublimator, the other one of the carbon dioxide recovery lines 10A, 10B can be kept operating. This achieves further efficient recovery of the carbon dioxide.

Further, the carbon dioxide recovery device 1A according to the first embodiment is configured with the decompression valve 9 between the regeneration tower 3 and the water vapor condensers 4A, 4B. The more the pressure is lowered by cooling the carbon dioxide desublimators 5A, 5B, the more quickly the carbon dioxide can turn to the dry ice, and the force for sucking the emitted carbon dioxide and the water vapor can be increased. However, decrease in the pressure of the carbon dioxide desublimators 5A, 5B leads to decrease in the pressure of the regeneration tower 3, so that the excessive decrease in the pressure inside the regeneration tower 3 could cause coexistence state of liquid and solid of the absorbing liquid (amino-based solvents) in the regeneration tower 3, which could rather degrade the efficiency in emission of the carbon dioxide. To address this, it is preferable to provide the decompression valve between the regeneration tower 3 and the water vapor condensers 4A, 4B to enable adjustment of the pressure of the regeneration tower 3 by the decompression valve 9.

Further, the carbon dioxide recovery device 1A according to the first embodiment is configured such that when the to-be-separated gas is the combustion exhaust gas from an iron manufacturing plant or a cement plant, for example, the carbon dioxide desublimators 5A, 5B are cooled down by the refrigerant to about minus 85 degrees centigrade or below, when the to-be-separated gas is the combustion exhaust gas from a power plant, the carbon dioxide desublimators 5A, 5B are cooled down by the refrigerant to about minus 96 degrees centigrade or below, and when the to-be-separated gas is the atmosphere, the carbon dioxide desublimators 5A, 5B are cooled down by the refrigerant to about minus 140 degrees centigrade or below. The temperature at which the carbon dioxide is in the gas-solid balanced state differs depending on the partial pressure of the carbon dioxide in the to-be-separated gas. Accordingly, by making the temperature inside the carbon dioxide desublimator to the temperature at which the gas-solid balanced state corresponding to the partial pressure value is kept, desublimation (solidification) of the carbon dioxide is started, and thus the carbon dioxide desublimators 5A, 5B can be kept under the negative pressure. Thereby, the water vapor and the carbon dioxide which have been emitted in the regeneration tower 3 can be sucked.

Second Embodiment

Next, a second embodiment of a carbon dioxide recovery device according to the present invention is explained with focus on different points from the carbon dioxide recovery device 1A according to the first embodiment with reference to the accompanying drawings.

Figure 2:
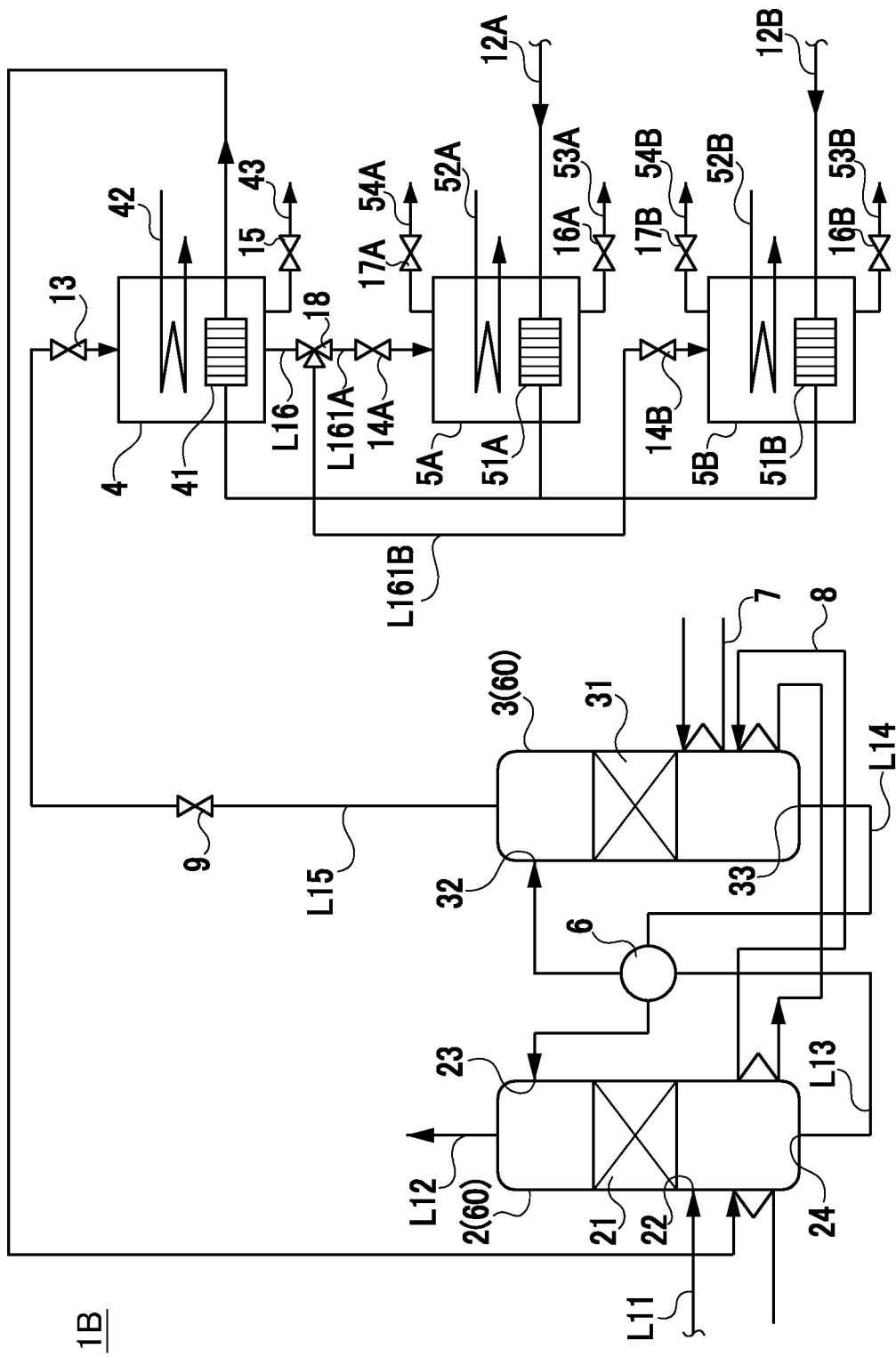
FIG. 2 is a schematic view showing a configuration of the carbon dioxide recovery device according to a second embodiment.

FIG. 2 is a schematic view showing a configuration of a carbon dioxide recovery device 1B according to the second embodiment. The configuration of the absorption tower 2 and the regeneration tower 3 is the same as the carbon dioxide recovery device 1A according to the first embodiment. The regeneration tower 3 is connected with one water vapor condenser 4 in series via a first transfer pipe L15. Then, the water vapor condenser 4 is connected with a second transfer pipe L16 to discharge carbon dioxide to the carbon dioxide desublimators 5A, 5B.

The second transfer pipe L16 is branched off to a branch transfer pipe L161A and a branch transfer pipe L161B by a switching valve 18. By this branching, the water vapor condenser 4 is connected in parallel with the carbon dioxide desublimator 5A and the carbon dioxide desublimator 5B. Operation of the switching valve 18 enables selection of either one of the carbon dioxide desublimators 5A, 5B through which carbon dioxide, which has been discharged from the regeneration tower 3 and has passed through the water vapor condenser 4, flows. Further, open-close valves 14A, 14B are provided on the branch transfer pipes L161A, L161B, respectively.

The carbon dioxide desublimators 5A, 5B are communicated with the refrigerant circuits 12A, 12B which utilize the cold heat in regasification of liquefied fuel as the refrigerant, respectively. The refrigerant circuits 12A, 12B each having passed through the carbon dioxide desublimators 5A, 5B are merged so that the refrigerant having flown through the carbon dioxide desublimators 5A, 5B further flows through the water vapor condenser 4 and the absorption tower 2 in this order.

According to the above-mentioned carbon dioxide recovery device 1B, too, when carbon dioxide is desublimated (solidified) in the carbon dioxide desublimator 5A (5B), the carbon dioxide desublimator 5A (5B) is depressurized to become under negative pressure. Thus, the carbon dioxide desublimator 5A (5B) functions as a pump, and thereby the water vapor and the carbon dioxide that have been emitted in the regeneration tower 3 are sucked. This suction causes flow of the water vapor from the regeneration tower 3 to the water vapor condenser 4 and causes flow of the carbon dioxide from the regeneration tower 3 through the water vapor condenser 4 to the carbon dioxide desublimator 5A (5B).

Further, in accordance with decompression of the carbon dioxide desublimator 5A (5B), the regeneration tower 3 connected in series is also decompressed, so that the boiling temperature of the absorbing liquid in the regeneration tower 3 is lowered. Therefore, the consumption energy for heating the absorbing liquid can be suppressed.

Further, when the carbon dioxide having turned into dry ice is to be recovered from the carbon dioxide desublimator 5A (5B), desublimation (solidification) of the carbon dioxide in the carbon dioxide desublimator 5A (5B) needs to be stopped. However, the switching valve 18 makes it possible to select either one of the carbon dioxide desublimators 5A, 5B through which the carbon dioxide, which has been discharged from the regeneration tower 3 and has passed through the water vapor desublimator 4, flows. Accordingly, when the carbon dioxide is to be recovered from the one carbon dioxide desublimator 5A, the other carbon dioxide desublimator 5B can keep performing desublimation (solidification) of the carbon dioxide. Therefore, the carbon dioxide can be recovered more efficiently.

As mentioned above, the carbon dioxide recovery device 1B according to the second embodiment is configured such that the regeneration tower 3 is connected with the one water vapor condenser 4, and the water vapor condenser 4 is connected in parallel with at least the two carbon dioxide desublimators 5A, 5B.

According to the above-mentioned carbon dioxide recovery device 1B, the regeneration tower 3 is connected with the one water vapor condenser 4, and the water vapor condenser 4 is connected in parallel with at least the two carbon dioxide desublimators 5A, 5B. Accordingly, when the dry ice is to be recovered by one of the carbon dioxide desublimators 5A, 5B by regasification and others, the other one of the carbon dioxide desublimators 5A, 5B may be kept operating, achieving further efficient recovery of the carbon dioxide.

Third Embodiment

Figure 3:
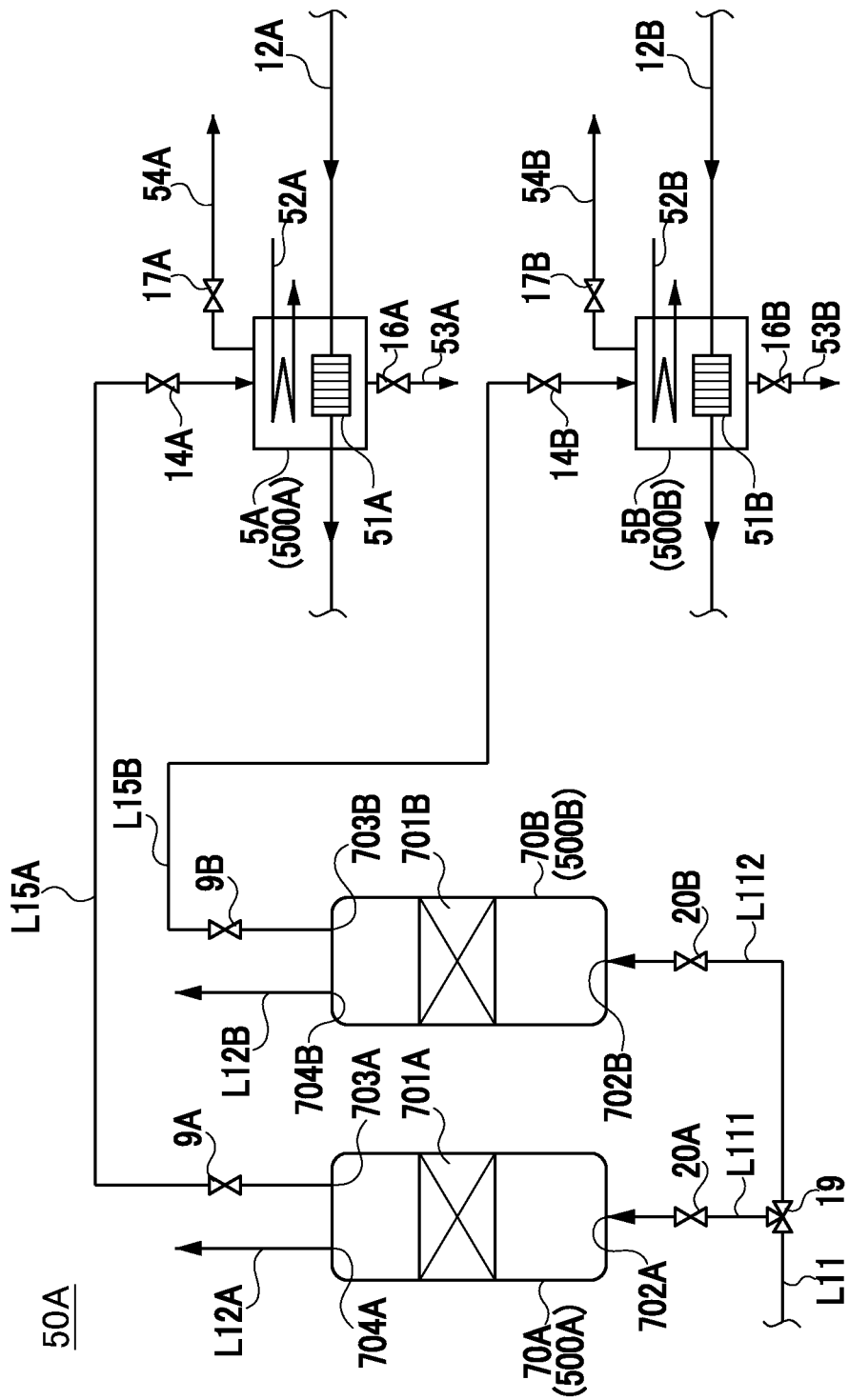
FIG. 3 is a schematic view showing a configuration of the carbon dioxide recovery device according to a third embodiment.

Next, a third embodiment of a carbon dioxide recovery device according to the present invention is explained in detail with reference to the accompanying drawings. FIG. 3 is a schematic view of a configuration of a carbon dioxide recovery device 50A according to the third embodiment.

The carbon dioxide recovery device 50A is provided with separation devices 70A, 70B and the carbon dioxide desublimators 5A, 5B as shown in FIG. 3. The separation device 70A is connected in series with the carbon dioxide desublimator 5A, and the separation device 70B is connected in series with the carbon dioxide desublimator 5B. Herein, the separation device 70A and the separation device 70B are the same devices, and the carbon dioxide desublimator 5A and the carbon dioxide desublimator 5B are the same devices.

The separation devices 70A, 70B are stored inside with adsorbents 701A, 701B to adsorb carbon dioxide. As the adsorbent, for example, there are used zeolite (for example, a molecular sieve 13X of UNION SHOWA K.K., and NSA-700 of Tosoh Corporation), amino-impregnated solid sorbent (porous substance carried with amine compound), gate-type sorbent (ELM-11 [Cu $(bpy)_2(BF_4)_2$], and others. The separation devices 70A, 70B are provided with gas introduction ports 702A, 702B below the sorbents 701A, 701B, respectively, and the gas introduction ports 702A, 702B are connected with a gas supply passage L11 to supply the combustion exhaust gas (one example of the to-be-separated gas) to the separation devices 70A, 70B. To be more specific, the gas supply passage L11 is branched off by a switching valve 19 to a branch gas supply passage L111 and a branch gas supply passage L112, and the branch gas supply passage L111 is connected to the gas introduction port 702A of the separation device 70A and the branch gas supply passage L112 is connected to the gas introduction port 702B.

The branch gas supply passage L111 is provided with an open-close valve 20A and the branch gas supply passage L112 is provided with an open-close valve 20B, and the combustion exhaust gas is supplied to the separation devices 70A, 70B by bringing the open-close valves 20A, 20B in a valve-open state. This combustion exhaust gas is the one utilizing the combustion exhaust gas generated in power generation and natural gas purification and the combustion exhaust gas generated from a combustor, a blast furnace, and others. The combustion exhaust gas includes about 10 to 20% of carbon dioxide and further includes nitrogen, oxygen, and others.

Further, the gas supply passage L11 is branched off by the switching valve 19 so that the gas supply passage L11 is connected in parallel with a carbon dioxide recovery line 500A and a carbon dioxide recovery line 500B. The carbon dioxide recovery line 500A is configured such that the separation device 70A and the carbon dioxide desublimator 5A are connected in series in this order from an upstream side of supplying the combustion exhaust gas. The carbon dioxide recovery line 500B is configured such that the separation device 70B and the carbon dioxide desublimator 5B are connected in series in this order from the upstream side of supplying the combustion exhaust gas. Operation of the switching valve 19 makes it possible to select either one of the carbon dioxide recovery line 500A and the carbon dioxide recovery line 500B through which the combustion exhaust gas supplied from the gas supply passage L11 is made flow.

The combustion exhaust gas supplied from the gas introduction port 702A (702B) ascends in the separation device 70A (70B) and comes to contact with the adsorbent 701A (701B) stored in the separation device 70A (70B). Then, the adsorbent 701A (701B) selectively adsorbs the carbon dioxide included in the combustion exhaust gas. By this adsorption, the carbon dioxide is separated from the combustion exhaust gas. Herein, the adsorbent 701A (701B) such as zeolite has a concern about degradation in the adsorption performance when the adsorbent takes in moisture, and thus it is conceivable to provide a water vapor removal device (not shown) on the gas supply passage L11 and supply the combustion exhaust gas, which has been removed with the water vapor by the water vapor removal device, to the separation device 70A (70B). Further, the combustion exhaust gas is conceived to include sulfur oxide, and thus a desulfurization unit (not shown) may be provided on the gas supply passage L11 so that the combustion exhaust gas which has been removed with the sulfur oxide is supplied to the separation device 70A (70B).

Then, the combustion exhaust gas (nitrogen and oxygen) which has been separated from the carbon dioxide is discharged from a discharge port 704A (704B) provided on a top portion of the separation device 70A (70B) to a discharge passage L12A (L12B).

The adsorbent 701A (701B) has its determined capacity of adsorbable amount of carbon dioxide by its volume or the like, and thus the adsorbent 701A (701B) which has absorbed a certain amount of the carbon dioxide cannot further adsorb the carbon dioxide. Accordingly, in order to adsorb further carbon dioxide, the adsorbent 701A (701B) needs to be desorbed. The desorption needs to be performed by placing the adsorbent 701A (701B) under the decompressed state, and accordingly, inside of the separation device 70A (70B) is decompressed. The carbon dioxide desorbed from the adsorbent 701A (701B) is diffused from a diffusion port 703A (703B) provided on a top portion of the separation device 70A (70B). Then, the adsorbent 701A (701B) that has been desorbed from the carbon dioxide is brought into contact with the combustion exhaust gas supplied from the gas introduction port 702A (702B) so that the adsorbent 701A (701B) can adsorb further carbon dioxide.

The diffusion port 703A (703B) is connected with the transfer pipe L15A (L15B), and the carbon dioxide diffused from the diffusion port 703A (703B) is discharged to the transfer pipe L15A. This discharge is performed by sucking the carbon dioxide by the negative pressure generated in the carbon dioxide desublimator 5A (5B) (the negative pressure generated in the carbon dioxide desublimator 5A (5B) will be explained below).

The carbon dioxide desublimator 5A (5B) is connected with the separation device 70A (70B) via the transfer pipe L15A (L15B) so that the carbon dioxide diffused from the separation device 70A (70B) can flow to the carbon dioxide desublimator 5A (5B). The transfer pipe L15A is provided with a decompression valve 9A and an open-close valve 14A in this order from an upstream side between the separation device 70A and the carbon dioxide desublimator 5A, and the transfer pipe L15B is provided with a decompression valve 9B and an open-close valve 14B between the separation device 70B and the carbon dioxide desublimator 5B. Herein, the decompression valve 9A and the decompression valve 9B are identical devices, and the open-close valve 14A and the open-close valve 14B are identical devices.

The carbon dioxide desublimator 5A (5B) is provided inside with a heat exchanger 51A (51B). The heat exchanger 51A (51B) is used for cooling the carbon dioxide therein by use of the refrigerant flowing through the refrigerant circuit 12A (12B). The carbon dioxide desublimator 5A (5B) is further connected with a heat pump 52A (52B) utilizing waste heat and ambient heat, a drain 53A (53B), and a take-out pipe 54A (54B). The drain 53A (53B) is provided with an open-close valve 16A (16B), and the take-out pipe 54A (54B) is provided with an open-close valve 17A (17B).

The refrigerant circuit 12A (12B) is configured to make the refrigerant flow inside the carbon dioxide desublimator 5A (5B). As the refrigerant, the cold heat after regasification of liquefied fuel (one example of fluid) is used. The liquefied fuel is, for example, exemplified by liquefied natural gas, liquid hydrogen, and liquefied methane. Further, as the refrigerant, the cold heat after regasification of the liquefied gas may be used. The liquefied gas is, for example, exemplified by liquefied nitrogen and liquefied oxygen.

Function of the refrigerant and the carbon dioxide desublimator 5A (5B) in the carbon dioxide recovery device 50A having the above-mentioned configuration is explained below.

The refrigerant passes through the refrigerant circuit 12A (12B) to cool the inside of the carbon dioxide desublimator 5A (5B) by the heat exchanger 51A (51B) of the carbon dioxide desublimator 5A (5B). When liquefied natural gas is used as the liquefied fuel, the cold heat is minus 162 degrees centigrade, and when liquid hydrogen is used, the cold heat is minus 253 degrees centigrade. The temperature inside the carbon dioxide desublimator 5A (5B) is however cooled to a temperature appropriate for desublimation (solidification) of the carbon dioxide by controlling a temperature gap by the heat exchanger 51A (51B) or by utilizing a separate operation medium or a refrigerant. For example, when combustion exhaust gas from an iron manufacturing plant or a cement plant is used as the to-be-separated gas, the temperature inside the carbon dioxide desublimator 5A (5B) is preferably cooled to about minus 85 degrees centigrade or below. Further, when combustion exhaust gas from a power plant is used as the to-be-separated gas, the temperature inside the carbon dioxide desublimator 5A (5B) is preferably cooled to about minus 96 degrees centigrade or below. Furthermore, when the atmosphere is used as the to-be-separated gas, the temperature inside the carbon dioxide desublimator 5A (5B) is preferably cooled to about minus 140 degrees centigrade or below.

By cooling down the temperature inside the carbon dioxide desublimator 5A (5B) to the temperature appropriate for desublimation (solidification) of the carbon dioxide, the carbon dioxide in the carbon dioxide desublimator 5A (5B) is desublimated (solidified) to become dry ice. In desublimation (solidification), there is a case that a minute amount of moisture remains in the carbon dioxide desublimator 5A (5B), but the thus remaining moisture is discharged from the drain 53A (53B) by opening the open-close valve 16A (16B). Further, when the carbon dioxide that has become dry ice is to be recovered, the open-close valve 17A (17B) is opened to bring the carbon dioxide desublimator 5A (5B) back to the normal temperature so that the dry ice is desublimated (gasified) and recovered from the take-out pipe 54A (54B). At this time, the open-close valves 14A (14B), 16A (16B) are in a valve-closed state so that the desublimated (gasified) carbon dioxide would not flow in any parts other than the take-out pipe 54A (54B). Then, the thus recovered carbon dioxide is utilized as carbon dioxide gas or the like.

Further, when the carbon dioxide is to be recovered, desublimation (solidification) of the carbon dioxide in the carbon dioxide desublimators 5A, 5B needs to be interrupted. However, as mentioned above, it is selectable to make flow the combustion exhaust gas supplied from the gas supply passage L11 into either one of the carbon dioxide recovery lines 500A, 500B by the switching valve 19. Accordingly, while the carbon dioxide is being recovered from the carbon dioxide desublimator 5A of the one carbon dioxide recovery line 500A, the carbon dioxide desublimator 5B of the other one carbon dioxide recovery line 500B can continuously desublimate (solidify) the carbon dioxide, and vice versa. Therefore, the carbon dioxide can be further efficiently recovered.

When desublimation (solidification) of the carbon dioxide is performed in the carbon dioxide desublimator 5A (5B), the carbon dioxide desublimator 5A (5B) is depressurized to be under negative pressure. Thereby, the carbon dioxide desublimator 5A (5B) functions as a pump to perform suction of the carbon dioxide that have been diffused from the separation device 70A (70B). This suction creates flow of the carbon dioxide from the separation device 70A (70B) to the carbon dioxide desublimator 5A (5B), so that desublimation (solidification) of the carbon dioxide in the carbon dioxide desublimator 5A (5B) is promoted.

While desorption of the adsorbent 701A (701B) is performed under the decompressed state, in accordance with decompression of the carbon dioxide desublimator 5A (5B), the separation device 70A (70B) connected in series with the carbon dioxide desublimator 5A (5B) is also depressurized to about 4 kPa. Accordingly, there is no need to provide a pump or the like to depressurize the separation device 70A (70B). In other words, no electric power for operating a pump or the like is required, thereby achieving energy conservation. Then, conservation in energy can achieve suppression of increase in the electric power cost and suppression of generation of further carbon dioxide for power generation. Herein, the pressure of the separation device 70A (70B) is adjusted by the decompression valve 9A (9B) provided on the transfer pipe L15A (L15B).

Modified Example of Third Embodiment

Figure 4:
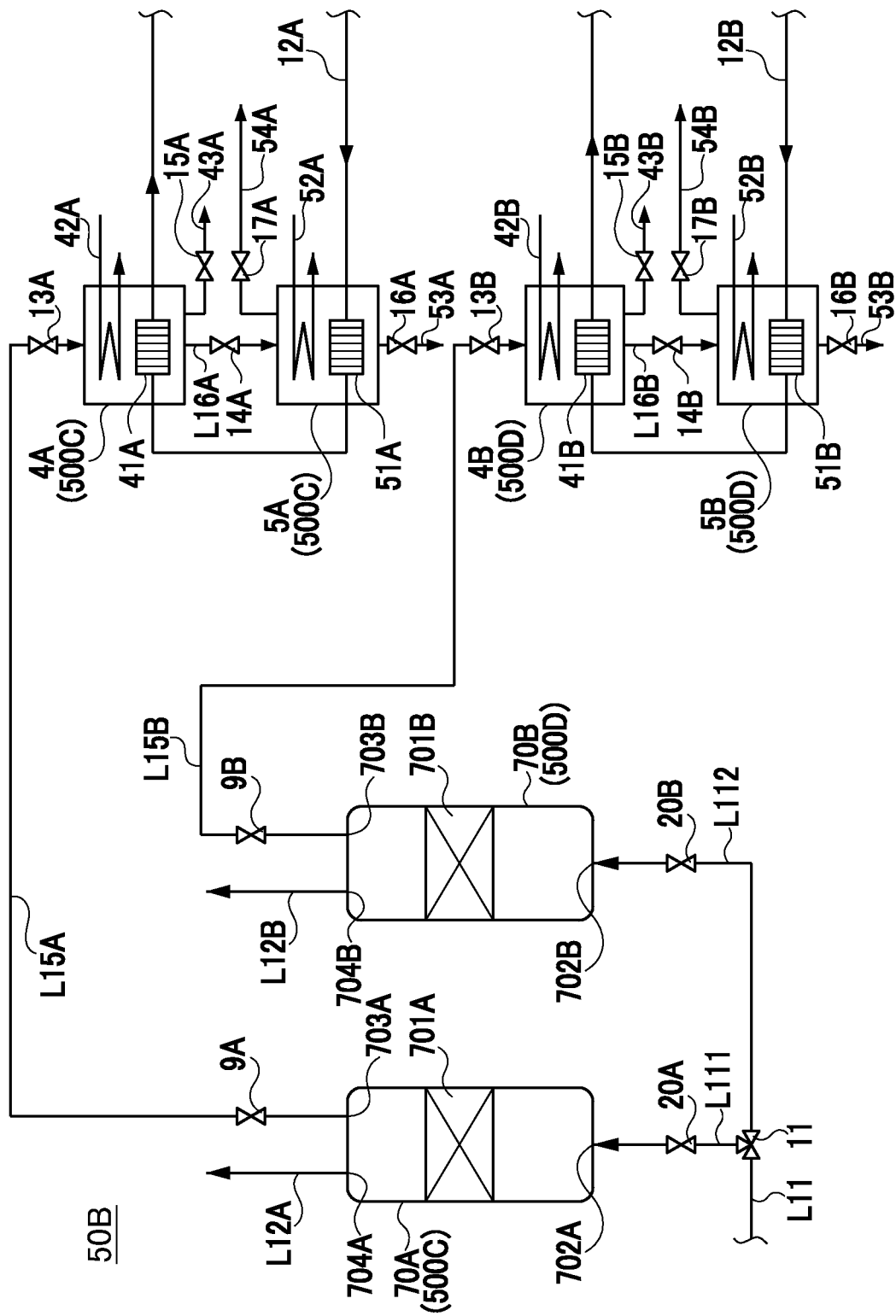
FIG. 4 is a schematic view showing a configuration of the carbon dioxide recovery device according to a modified example of the third embodiment.

Next, a carbon dioxide recovery device 50B according to a modified example of the third embodiment is explained with reference to FIG. 4. FIG. 4 is a schematic view of a configuration of the carbon dioxide recovery device 50B according to the modified example of the third embodiment.

The carbon dioxide recovery line 500A (500B) of the carbon dioxide recovery device 50A according to the above-mentioned third embodiment is configured with the separation device 70A (70B) and the carbon dioxide desublimator 5A (5B) which are connected in series. On the other hand, a carbon dioxide recovery line 500C (500D) in the carbon dioxide recovery device 50B is configured with the separation device 70A (70B), the water vapor condenser 4A (4B), and the carbon dioxide desublimator 5A (5B) connected in series in this order from an upstream side of supplying the combustion exhaust gas.

There is a concern about the adsorbent 701A (701B) such as zeolite, about decline in adsorption performance when it adsorbs moisture, and thus the carbon dioxide recovery device 50A is configured such that the combustion exhaust gas that has been removed with water vapor in advance is supplied to the separation device 70A (70B). However, in recent years, an adsorbent, which hardly lowers its adsorption performance even after the adsorbent adsorbs moisture, has been studied and developed. When such an adsorbent (for example, amine-impregnated solid sorbent) is used for the separation device 70A (70B), it is conceivable to supply the combustion exhaust gas including water vapor to the separation device 70A (70B). When the combustion exhaust gas including the water vapor is to be supplied to the separation device 70A (70B), in diffusing the carbon dioxide from the separation device 70A (70B), it is assumed that the water vapor is diffused with the carbon dioxide. If the water vapor is solidified with the carbon dioxide in the carbon dioxide desublimator 5A (5B), recovery of the carbon dioxide becomes difficult. To address this, the separation device 70A (70B), the water vapor condenser 4A (4B), and the carbon dioxide desublimator 5A (5B) are connected in series as the carbon dioxide recovery device 50B so that the carbon dioxide and the water vapor diffused from the separation device 70A (70B) firstly flow in the water vapor condenser 4A (4B) and only the water vapor is cooled by the refrigerant and condensed in the water vapor condenser 4A (4B). The water vapor is firstly condensed, and accordingly only the carbon dioxide flows to the subsequent carbon dioxide desublimator 5A (5B) and is cooled by the refrigerant and desublimated (solidified) in the carbon dioxide desublimator 5A (5B). Thus, recovery of the carbon dioxide is made easily.

The separation device 70A (70B) stores the adsorbent 701A (701B) therein. The adsorbent is the one hardly lowering its adsorption performance of adsorbing the carbon dioxide even if the moisture (for example, amine-impregnated solid sorbent) is included. Other configuration of the separation device 70A (70B) is identical with the separation device 70A (70B) of the carbon dioxide recovery device 50A, and thus its explanation is omitted.

The separation device 70A (70B) is connected with the water vapor condenser 4A (4B) via the first transfer pipe L15A (L15B) so that the carbon dioxide and the water vapor which are diffused from the separation device 70A (70B) are allowed to flow in the water vapor condenser 4A (4B). Herein, the first transfer pipe L15A is provided with the decompression valve 9A and the open-close valve 13A in this order from the upstream side between the separation device 70A and the water vapor condenser 4A. The first transfer pipe L15B is provided with the decompression valve 9B and the open-close valve 13B in this order from the upstream side between the separation device 70B and the water vapor condenser 4B.

The water vapor condenser 4A (4B) is provided with the heat exchanger 41A (41B) inside. The heat exchanger 41A is used for cooling the water vapor and the carbon dioxide that have reached the water vapor condenser 4A (4B) from the separation device 70A (70B) by the refrigerant flowing in the refrigerant circuit 12A (12B). The water vapor condenser 4A (4B) is further connected with the heat pump 42A (42B) utilizing the waste heat and the ambient heat and the drain 43A (43B). The drain 43A (43B) includes the open-close valve 15A (15B).

Further, the water vapor condenser 4A (4B) is connected with the carbon dioxide desublimator 5A (5B) via the second transfer pipe L16A (L16B). Further, the second transfer pipe L16A (L16B) is provided with the open-close valve 14A (14B) between the water vapor condenser 4A (4B) and the carbon dioxide desublimator 5A (5B).

The carbon dioxide desublimator 5A (5B) is a device identical with the carbon dioxide desublimator 5A (5B) in the carbon dioxide recovery device 50A to desublimate (solidify) the carbon dioxide by the refrigerant flowing in the refrigerant circuit 12A (12B) by use of the heat exchanger 51A (51B) provided therein.

The refrigerant circuit 12A (12B) is configured to make flow the refrigerant in the order of the carbon dioxide desublimator 5A (5B) and the water vapor condenser 4A (4B). The one used for the refrigerant is the cold heat after regasification of the liquefied fuel (one example of fluid) as similar to the carbon dioxide recovery device 50A.

Function of the refrigerant, the water vapor condenser 4A (4B), and the carbon dioxide desublimator 5A (5B) in the carbon dioxide recovery device 50B having the above-mentioned configuration is explained below.

The refrigerant passes through the refrigerant circuit 12A (12B) to firstly cool the inside of the carbon dioxide desublimator 5A (5B) to the temperature appropriate for desublimation (solidification) of the carbon dioxide by the heat exchanger 51A (51B) of the carbon dioxide desublimator 5A (5B) so that the carbon dioxide in the carbon dioxide desublimator 5A (5B) is desublimated (solidified). This is similar to the carbon dioxide recovery device 50A. Herein, the temperature appropriate for desublimation (solidification) of the carbon dioxide is about minus 85 degrees centigrade or below when the combustion exhaust gas from an iron manufacturing plant or a cement plate is used as the to-be-separated gas, about minus 96 degrees centigrade or below when the combustion exhaust gas from a power plant is used as the to-be-separated gas, and about minus 140 degrees centigrade or below when the atmosphere is used as the to-be-separated gas.

When desublimation (solidification) of the carbon dioxide is performed in the carbon dioxide desublimator 5A (5B), the carbon dioxide desublimator 5A (5B) is depressurized to be under negative pressure. Thereby, the carbon dioxide desublimator 5A (5B) functions as a pump to perform suction of the water vapor and the carbon dioxide that have been diffused from the separation device 70A (70B). This suction creates flow of the water vapor and the carbon dioxide toward the water vapor condenser 4A (4B) and the carbon dioxide desublimator 5A (5B).

Further, in association with decompression of the carbon dioxide desublimator 5A (5B), the separation device 70A (70B) connected in series with the carbon dioxide desublimator 5A (5B) is depressurized to about 4 kPa, which is similar to the carbon dioxide recovery device 50A.

After cooling inside the carbon dioxide desublimator 5A (5B), the refrigerant flows to the water vapor condenser 4A (4B) to cool the inside of the water vapor condenser 4A (4B) by the heat exchanger 41A (41B) of the water vapor condenser 4A (4B). The temperature of the refrigerant has increased by heat exchanging in the heat exchanger 51A (51B) of the carbon dioxide desublimator 5A (5B), and thus inside the water vapor condenser 4A (4B) is cooled down to about 1 degree centigrade.

Since the water vapor condenser 4A (4B) is about 1 degree centigrade, the carbon dioxide and the water vapor which are sucked by the negative pressure generated in the carbon dioxide desublimator 5A (5B) and discharged from the separation device 70A (70B) are made to flow into the water vapor condenser 4A (4B) to be cooled down to about 20 degrees centigrade. Thereby, the water vapor is condensed to become water. The water is stored on a bottom part of the water vapor condenser 4A (4B), and the thus stored water is discharged through the drain 43A (43B) by opening the open-close valve 15A (15B).

The carbon dioxide that has flown with the water vapor in the water vapor condenser 4A (4B) remains as gaseous body in a temperature about 20 degrees centigrade, and accordingly, the carbon dioxide is sucked by the carbon dioxide desublimator 5A (5B), so that the carbon dioxide passes through the second transfer pipe L16A (L16B) and flows in the carbon dioxide desublimator 5A (5B). Then, the carbon dioxide having flown in the carbon dioxide desublimator 5A (5B) is desublimated (gasified) as mentioned above.

As mentioned above, the carbon dioxide recovery device 50A according to the third embodiment or the carbon dioxide recovery device 50B according to the modified example is configured such that the separation devices 70A, 70B store the adsorbents 701A, 701B adsorbing carbon dioxide and is configured to separate the carbon dioxide from the to-be-separated gas by adsorbing the carbon dioxide included in the to-be-separated gas (for example, the combustion exhaust gas) that has been supplied to the separation devices 70A, 70B.

According to the above-mentioned carbon dioxide recovery devices 50A, 50B, the separation devices 70A, 70B store the adsorbent (such as zeolite, amine-impregnated solid sorbent, and gate-type sorbent) 701A, 701B that can adsorb the carbon dioxide, respectively, and accordingly, the carbon dioxide can be separated from the to-be-separated gas by adsorbing the carbon dioxide included in the to-be-separated gas. Then, the carbon dioxide adsorbed by the adsorbents 701A, 701B can be recovered by desorbing from the adsorbents 701A, 701B. This desorption is generally performed under the depressurized state, but the separation devices 70A, 70B connected in series with the carbon dioxide desublimators 5A, 5B are also decompressed in accordance with decompression of the carbon dioxide desublimators 5A, 5B by the refrigerant, and accordingly, there is no need to provide a pump or the like to decompress the separation devices 70A, 70B. In other words, electric power for operating the pump or the like is not necessary, thereby achieving energy conservation. The energy conservation further achieves suppression of increase in the electric power cost and suppression of generation of further carbon dioxide for power generation.

Further, the carbon dioxide recovery device 50A according to the third embodiment and the carbon dioxide recovery device 50B according to the modified example are configured such that the separation devices 70A, 70B are configured to emit water vapor with the carbon dioxide. The carbon dioxide recovery devices 50A, 50B include the water vapor condensers 4A, 4B to condense the water vapor. The separation devices 70A, 70B, the water vapor condensers 4A, 4B, and the carbon dioxide desublimators 5A, 5B are connected in series in order from an upstream side of supplying the to-be-separated gas (for example, the combustion exhaust gas). The refrigerant circuits 12A, 12B are connected to the water vapor condensers 4A, 4B and the carbon dioxide desublimators 5A, 5B, respectively, and the water vapor is condensed and the carbon dioxide is desublimated (solidified) by the refrigerant.

When the water vapor is emitted with the carbon dioxide from the separation devices 70A, 70B, recovery of the carbon dioxide becomes difficult if the water vapor is solidified with the carbon dioxide in the carbon dioxide desublimators 5A, 5B. To address this, as the carbon dioxide recovery devise 50B, the separation devices 70A, 70B, the water vapor condensers 4A, 4B, and the carbon dioxide desublimators 5A, 5B are connected in series, respectively, so that the carbon dioxide and the water vapor emitted from the separation devices 70A, 70B first flow to the water vapor condensers 4A, 4B, and only the water vapor is cooled by the refrigerant and condensed in the water vapor condenser. The water vapor is first condensed, and thus only the carbon dioxide flows to the subsequent carbon dioxide desublimators 5A, 5B to be cooled by the refrigerant and desublimated (solidified) in the carbon dioxide desublimators 5A, 5B. Thereby, recovery of the carbon dioxide is made easily.
Page 31:

Fourth Embodiment

Figure 5:
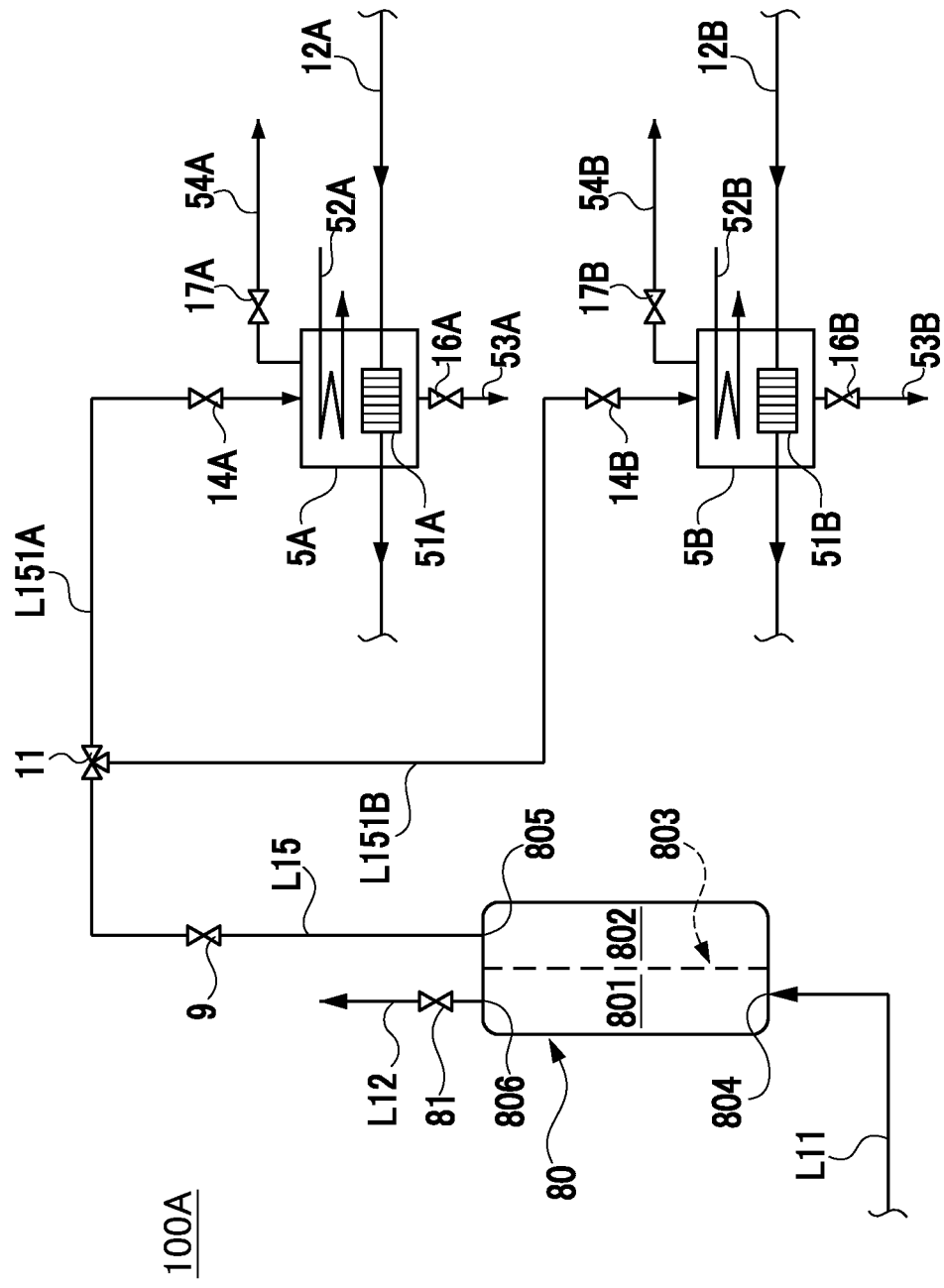
FIG. 5 is a schematic view showing a configuration of the carbon dioxide recovery device according to a fourth embodiment.

Next, a carbon dioxide recovery device 100A according to a fourth embodiment is explained with reference to FIG. 5 as for different features from the carbon dioxide recovery devices 50A, 50B according to the third embodiment. FIG. 5 is a schematic view of a configuration of the carbon dioxide recovery device 100A according to the fourth embodiment.

The carbon dioxide recovery device 100A is provided with a separation device 80 and the carbon dioxide desublimators 5A, 5B. The two carbon dioxide desublimators 5A, 5B are the identical devices.

The separation device 80 retains a permeable membrane 803 therein to selectively transmit carbon dioxide. As the permeable membrane 803, for example, an inorganic membrane such as a zeolite membrane (such as a high silica CHA zeolite membrane and DDR zeolite membrane) and an organic membrane such as a molecular gate membrane are used. This permeable membrane 803 divides inside of the separation device 80 into a non-transmission side 801 and a transmission side 802. The non-transmission side 801 is provided with a gas introduction port 804, and the gas introduction port 804 is connected with the gas supply passage L11. Thus, the combustion exhaust gas can be supplied to the separation device 80 (the non-transmission side 801). Herein, the combustion exhaust gas to be supplied to this separation device 80 (the non-transmission side 801) is the one that has been removed with water vapor and sulfur oxide by a not-shown water vapor removal device and a not-shown desulfurization device which are provided on the gas supply passage L11.

The transmission side 802 is used to selectively transmit the carbon dioxide. Namely, among components included in the combustion exhaust gas to be supplied to the separation device 80 (the non-transmission side 801), only carbon dioxide can move to the transmission side 802, and nitrogen and oxygen other than the carbon dioxide are not allowed to transmit the permeable membrane 803 and reside in the non-transmission side 801.

Further, the non-transmission side 801 is provided with a discharge port 806, and the discharge port 806 is connected with a discharge passage L12 to discharge nitrogen, oxygen, and others remaining in the non-transmission side 801. Furthermore, the discharge passage L12 includes an open-close valve 81.

The transmission side 802 is provided with a diffusion port 805 to diffuse the carbon dioxide that has passed through the permeable membrane 803. The diffusion port 805 is connected with a transfer pipe L15 so that the carbon dioxide diffused from the discharge port 805 is discharged to the transfer pipe L15. This discharge is performed by suction of the carbon dioxide sucked by the negative pressure generated in the carbon dioxide desublimator 5A (5B).

The transfer pipe L15 is branched off by the switching valve 11 to the branch transfer pipe L151A and the branch transfer pipe L151B. By this branching, the separation device 80 (the transmission side 802) is connected with the carbon dioxide desublimator 5A via the transfer pipe L15 and the branch transfer pipe L151A and connected with the carbon dioxide desublimator 5B via the transfer pipe L15 and the branch transfer pipe L151B. Then, operation of the switching valve 11 makes it possible to select either one of the carbon dioxide desublimators 5A, 5B through which the carbon dioxide discharged from the separation device 80 flows. Herein, the branch transfer pipe L151A (L151B) is provided with an open-close valve 14A (14B) between the switching valve 11 and the carbon dioxide desublimator 5A (5B).

The carbon dioxide desublimator 5A (5B) is identical with the carbon dioxide desublimator 5A (5B) in the carbon dioxide recovery devices 50A, 50B and is configured to desublimate (solidify) the carbon dioxide by the refrigerant flowing in the refrigerant circuit 12A (12B) by use of the heat exchanger 51A (51B) inside the device. The refrigerant circuit 12A (12B) is also identical with the refrigerant circuit 12A (12B) in the carbon dioxide recovery device 50A, and thus explanation thereof is omitted.

Function of the refrigerant and the carbon dioxide desublimator 5A (5B) in the carbon dioxide recovery device 100A having the above-mentioned configuration is explained below.

The refrigerant passes through the refrigerant circuit 12A (12B) to cool the inside of the carbon dioxide desublimator 5A (5B) to the temperature appropriate for desublimation (solidification) of the carbon dioxide by the heat exchanger 51A (51B) of the carbon dioxide desublimator 5A (5B) so that the carbon dioxide in the carbon dioxide desublimator 5A (5B) is desublimated (solidified). This is similar to the carbon dioxide recovery device 50A. Herein, the temperature appropriate for desublimation (solidification) of the carbon dioxide is about minus 85 degrees centigrade or below when the combustion exhaust gas from an iron manufacturing plant or a cement plant is used as the to-be-separated gas, about minus 96 degrees centigrade or below when the combustion exhaust gas from a power plant is used as the to-be-separated gas, and about minus 140 degrees centigrade or below when the atmosphere is used as the to-be-separated gas.

When the carbon dioxide is to be recovered, desublimation (solidification) of the carbon dioxide in the carbon dioxide desublimators 5A, 5B needs to be interrupted. However, as mentioned above, it is selectable to make flow the combustion exhaust gas discharged from the separation device 80 into either one of the carbon dioxide desublimators 5A, 5B by the switching valve 11. Accordingly, while the carbon dioxide is being recovered from the one carbon dioxide desublimator 5A, the other carbon dioxide desublimator 5B can continuously desublimate (solidify) the carbon dioxide, and vice versa. Therefore, the carbon dioxide can be further efficiently recovered.

When desublimation (solidification) of the carbon dioxide is performed in the carbon dioxide desublimator 5A (5B), the carbon dioxide desublimator 5A (5B) is depressurized to be under negative pressure. Thereby, the carbon dioxide desublimator 5A (5B) functions as a pump to perform suction of the carbon dioxide that have been diffused from the separation device 80. This suction creates flow of the carbon dioxide from the separation device 80 to the carbon dioxide desublimator 5A (5B), so that desublimation (solidification) of the carbon dioxide in the carbon dioxide desublimator 5A (5B) is promoted.

While the carbon dioxide desublimator 5A (5B) is decompressed, the separation device 80 (the transmission side 802) connected in series with the carbon dioxide desublimator 5A (5B) is also depressurized to about 4 kPa. Accordingly, even if a pump or the like to depressurize the separation device 80 (the transmission side 802) is not provided, the carbon dioxide included in the combustion exhaust gas supplied to the non-transmission side 801 of the separation device 80 is sucked by the transmission side 802, so that separation of the carbon dioxide is promoted. In other words, no electric power for operating the pump or the like is required, thereby achieving energy conservation. Then, conservation in energy can achieve suppression of increase in the electric power cost and achieve suppression of generation of further carbon dioxide for power generation. The pressure of the separation device 80 is adjusted by the decompression valve 9 provided on the transfer pipe L15. Herein, when this separation of carbon dioxide is to be performed, the open-close valve 18 is closed to prevent backflow from the discharge passage L12 to the separation device 80. Then, in a case when the non-transmission side 801 is filled with nitrogen, oxygen, and others other than the carbon dioxide and no any further combustion exhaust gas is allowed to be supplied to the non-transmission side 801, the open-close valve 81 is opened to discharge the nitrogen, oxygen, and others.

Modified Example of Fourth Embodiment

Figure 6:
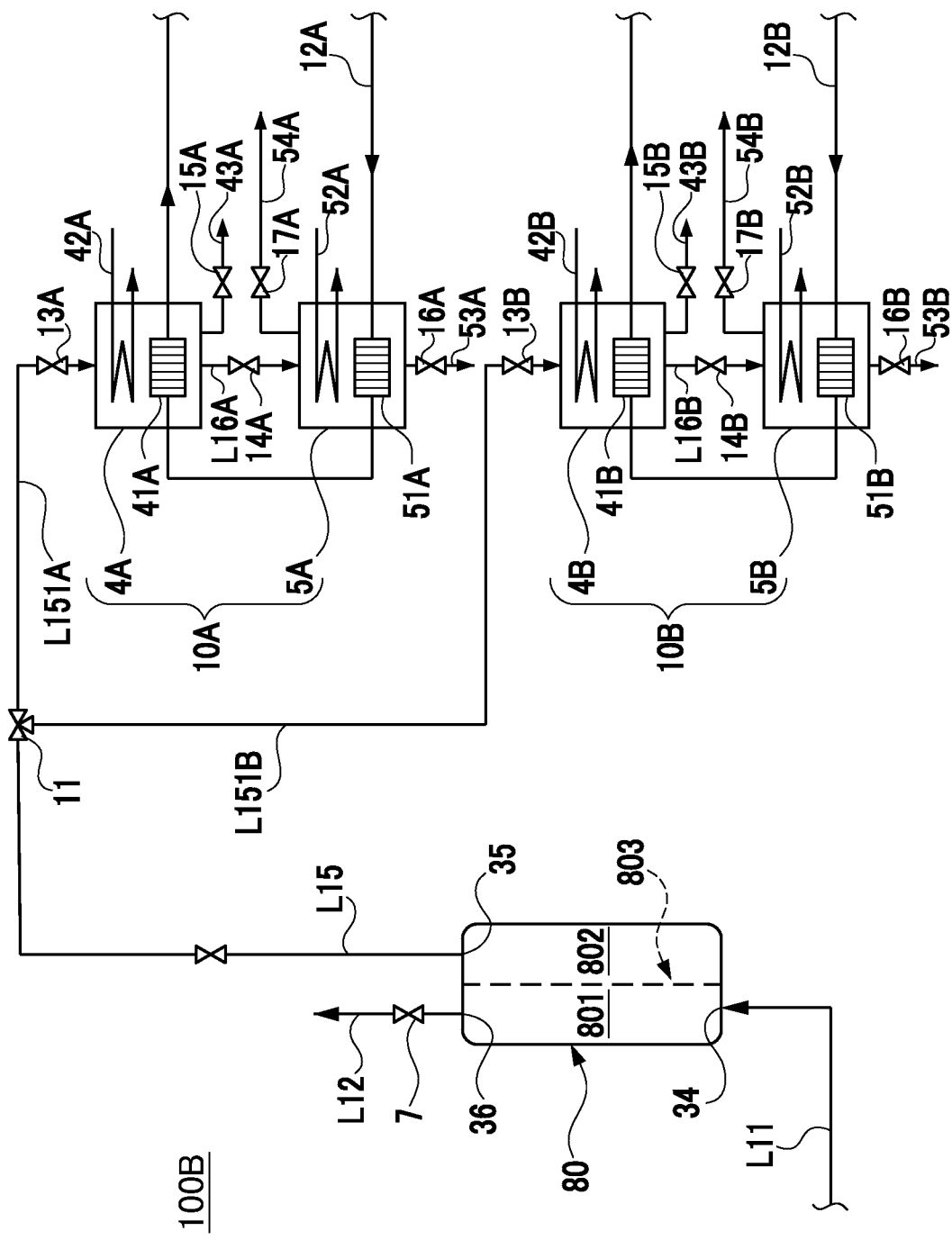
FIG. 6 is a schematic view showing a configuration of the carbon dioxide recovery device according to a modified example of the fourth embodiment.

Next, a carbon dioxide recovery device 100B according to a modified example of the fourth embodiment is explained in detail with reference to FIG. 6. FIG. 6 is a schematic view of a configuration of the carbon dioxide recovery device 100B according to the modified example of the fourth embodiment.

The carbon dioxide recovery device 100B is configured with the separation device 80, the carbon dioxide recovery line 10A in which the water vapor condenser 4A and the carbon dioxide desublimator 5A are connected in series, and the carbon dioxide recovery line 10B in which the water vapor condenser 4B and the carbon dioxide desublimator 5B are connected in series.

When combustion exhaust gas including water vapor is supplied to the separation device 80, in performing diffusion of the carbon dioxide from the separation device 80, it is assumed that the water vapor could be diffused with the carbon dioxide. If the water vapor is solidified with the carbon dioxide in the carbon dioxide desublimator 5A (5B), recovery of the carbon dioxide becomes difficult. To address this, as the carbon dioxide recovery device 100B, the separation device 80, the water vapor condenser 4A (4B), and the carbon dioxide desublimator 5A (5B) are connected in series so that the carbon dioxide and the water vapor diffused from the separation device 80 firstly flow in the water vapor condenser 4A (4B), and only the water vapor is cooled down by the refrigerant and condensed in the water vapor condenser 4A (4B). The water vapor is firstly condensed, and thus only the carbon dioxide flows to the subsequent carbon dioxide desublimator 5A (5B) and only this carbon dioxide is cooled by the refrigerant and desublimated (solidified) in the carbon dioxide desublimator 5A (5B). Thereby, recovery of the carbon dioxide is made easy.

The separation device 80 is the one identical with the separation device 80 in the above-mentioned carbon dioxide recovery device 100A. The carbon dioxide and the water vapor diffused from the separation device 80 are discharged to the first transfer pipe L15. This discharge is made by sucking the carbon dioxide and the water vapor by the negative pressure generated in desublimation (solidification) of the carbon dioxide in the carbon dioxide desublimators 5A, 5B.

The first transfer pipe L15 is branched off by the switching valve 11 to the branch transfer pipe L151A and the branch transfer pipe L151B. By this branching of the pipe, the separation device 80 (the transmission side 802) is connected with the carbon dioxide recovery line 10A formed of the water vapor condenser 4A and the carbon dioxide desublimator 5A via the first transfer pipe L15 and the branch transfer pipe L151A and connected with the carbon dioxide recovery line 10B formed of the water vapor condenser 4B and the carbon dioxide desublimator 5B via the first transfer pipe L15 and the branch transfer pipe L151B. Then, operation of the switching valve 11 allows selection of flow of the carbon dioxide and the water vapor which are diffused from the separation device 80 (the transmission side 802) to either one of the carbon dioxide recovery lines 10A and 10B. Herein, the branch transfer pipe L151A (L151B) is provided with the open-close valve 13A (13B) between the switching valve 11 and the water vapor condenser 4A (4B).

The water vapor condenser 4A (4B) is the one identical with the water vapor condenser 4A (4B) in the carbon dioxide recovery device 50B to condense the water vapor by the refrigerant flowing in the refrigerant circuit 12A (12B) by use of the heat exchanger 41A (41B) provided therein. The water vapor condenser 4A (4B) is connected to the carbon dioxide desublimator 5A (5B) via the second transfer pipe L16A (L16B). Herein, the second transfer pipe L16A (L16B) is provided with the open-close valve 14A (14B) between the water vapor condenser 4A (4B) and the carbon dioxide desublimator 5A (5B).

The carbon dioxide desublimator 5A (5B) is the one identical with the carbon dioxide desublimator 5A (5B) in the carbon dioxide recovery devices 50A, 50B, and 100A to desublimate (solidify) the carbon dioxide by the refrigerant flowing in the refrigerant circuit 12A (12B) by use of the heat exchanger 51A (51B) provided therein.

Further, the refrigerant circuit 12A (12B) is configured such that the refrigerant flows in an order of the carbon dioxide desublimator 5A (5B) and the water vapor condenser 4A (4B) as similar to the carbon dioxide recovery device 50B. As the refrigerant, the cold heat formed by regasification of liquefied fuel (one example of fluid) is used as similar to the carbon dioxide recovery devices 50A, 50B, and 100A.

Function of the refrigerant, the water vapor condenser 4A (4B), and the carbon dioxide desublimator 5A (5B) in the carbon dioxide recovery device 100B having the above-mentioned configuration is explained below.

The refrigerant passes through the refrigerant circuit 12A (12B) to firstly cool inside the carbon dioxide desublimator 5A (5B) to the temperature appropriate for desublimation (solidification) of the carbon dioxide by the heat exchanger 51A (51B) of the carbon dioxide desublimator 5A (5B) so that the carbon dioxide in the carbon dioxide desublimator 5A (5B) is desublimated (solidified). This is similar to the carbon dioxide recovery devices 50A, 50B, and 100A. Herein, the temperature appropriate for desublimation (solidification) of the carbon dioxide is about minus 85 degrees centigrade or below when the combustion exhaust gas from an iron manufacturing plant or a cement plant is used as the to-be-separated gas, about minus 96 degrees centigrade or below when the combustion exhaust gas from a power plant is used as the to-be-separated gas, and about minus 140 degrees centigrade or below when the atmosphere is used as the to-be-separated gas as mentioned above.

When desublimation (solidification) of the carbon dioxide is performed in the carbon dioxide desublimator 5A (5B), the carbon dioxide desublimator 5A (5B) is depressurized to be under negative pressure. Thereby, the carbon dioxide desublimator 5A (5B) functions as a pump to perform suction of the water vapor and the carbon dioxide that have been diffused from the separation device 80. This suction generates flow of the water vapor and the carbon dioxide toward the water vapor condenser 4A (4B) and the carbon dioxide desublimator 5A (5B).

Further, in association with decompression of the carbon dioxide desublimator 5A (5B), the separation device 80 connected in series is depressurized to about 4 kPa, which is similar to the carbon dioxide recovery device 100A.

After cooling inside the carbon dioxide desublimator 5A (5B), the refrigerant flows to the water vapor condenser 4A (4B) to cool inside the water vapor condenser 4A (4B) by the heat exchanger 41A (41B) of the water vapor desublimator 4A (4B). The temperature of the refrigerant increases by heat exchanging in the heat exchanger 51A (51B) of the carbon dioxide desublimator 5A (5B), and thus the inside of the water vapor condenser 4A (4B) is cooled down to about 1 degree centigrade.

Since the water vapor condenser 4A (4B) is about 1 degree centigrade, the carbon dioxide and the water vapor which are sucked by the negative pressure generated in the carbon dioxide desublimator 5A (5B) and discharged from the separation device 80 (the transmission side 802) are made to flow into the water vapor condenser 4A (4B) to be cooled down to about 20 degrees centigrade. Thereby, the water vapor is condensed to become water. The water is stored on a bottom part of the water vapor condenser 4A (4B), and the thus stored water is discharged through the drain 43A (43B) by opening the open-close valve 15A (15B).

The carbon dioxide that has flown with the water vapor in the water vapor condenser 4A (4B) remains as gaseous body in a temperature about 20 degrees centigrade, and accordingly, the carbon dioxide is sucked by the carbon dioxide desublimator 5A (5B) so that the carbon dioxide passes through the second transfer pipe L16A (L16B) and flows in the carbon dioxide desublimator 5A (5B). Then, the carbon dioxide having flown in the carbon dioxide desublimator 5A (5B) is desublimated (solidified) as mentioned above.

As explained above, the carbon dioxide recovery device 100A according to the fourth embodiment and the carbon dioxide recovery device 100B according to its modified example are configured such that the separation device 80 is provided with the permeable membrane 803 to selectively transmit carbon dioxide, and the permeable membrane 803 transmits the carbon dioxide included in the to-be-separated gas (such as combustion exhaust gas) that has been supplied to the separation device 80 to separate the carbon dioxide from the to-be-separated gas (such as the combustion exhaust gas). The carbon dioxide desublimators 5A, 5B are connected to the transmission side 802 of the permeable membrane 803 of the separation device 80.

According to the above-mentioned carbon dioxide recovery devices 100A, 100B, the separation device 80 is provided with the permeable membrane (for example, an inorganic membrane such as a zeolite membrane and an organic membrane such as a molecular gate membrane) 803 to selectively transmit the carbon dioxide, and thus the carbon dioxide included in the to-be-separated gas (such as the combustion exhaust gas) that has been supplied to the separation device 80 is separated to the transmission side 802 of the permeable membrane 803. Then, the carbon dioxide desublimators 5A, 5B are connected to the transmission side 802 of the permeable membrane 803 of the separation device 80, and accordingly, the carbon dioxide separated from the to-be-separated gas is cooled by the refrigerant and desublimated (solidified) in the carbon dioxide desublimators 5A, 5B. The carbon dioxide desublimators 5A, 5B are depressurized by this desublimation (solidification) to depressurize the transmission side 802 of the separation device 80 connected with the carbon dioxide desublimators 5A, 5B, so that separation of the carbon dioxide by the permeable membrane 803 is promoted. A pump or the like for decompression is not required, and thus no electric power is necessary, achieving energy conservation. Further, this energy conservation can achieve suppression of increase in electric power cost and achieve suppression of generation of further carbon dioxide for power generation. In the carbon dioxide recovery devices 1A, 1B, 50A, 50B, 100A, and 100B explained above, after the carbon dioxide is desublimated (solidified) to obtain dry ice, an inside temperature of the carbon dioxide desublimator 5A (5B) is returned to a normal temperature to desublimate (gasify) the dry ice and the device recovers the dry ice from the take-out pipe 54A (54B). As above, in recovering the carbon dioxide as gaseous body, for example, if a chemical plant is located adjacent to the carbon dioxide recovery devices 1A, 1B, 50A, 50B, 100A, and 100B, the carbon dioxide recovered as the gaseous body can be supplied to the chemical plant through a pipe, so that the carbon dioxide can be efficiently used.

Alternatively, in the carbon dioxide recovery devices 1A, 1B, 50A, 50B, 100A, and 100B, the carbon dioxide may be recovered as liquid body instead of gaseous body. In considering transportation after recovery of the carbon dioxide, it is better to recover as the liquid body since transportation by lorries or trucks is made more easily. Further, in the carbon dioxide desublimator 5A (5B), liquefication of the dry ice rather than gasification can achieve a reduction in an increase range of a temperature inside the carbon dioxide desublimator 5A (5B). Therefore, in order to desublimate (solidify) the carbon dioxide again after taking out the carbon dioxide from the carbon dioxide desublimator 5A (5B), the cold heat used as the refrigerant for cooling the carbon dioxide desublimators 5A, 5B can be saved.

Figure 7:
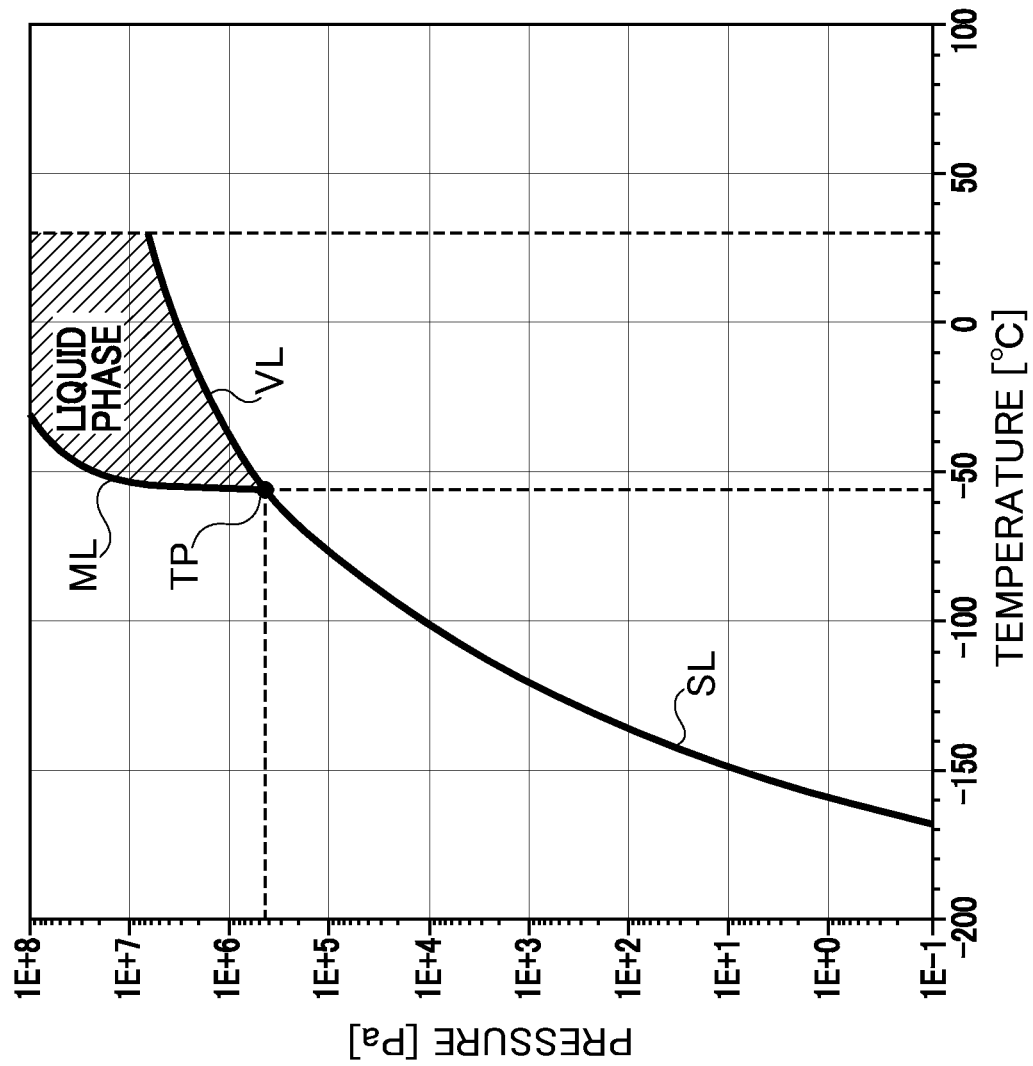
FIG. 7 is a graph showing a state of carbon dioxide.

FIG. 7 is a graph showing a state of the carbon dioxide. According to this graph, a region surrounded by a melting line ML and a vaporization line VL is a region obtained by a liquid phase of the carbon dioxide (hereinafter, referred as liquefied carbon dioxide). Accordingly, in order to recover the liquefied carbon dioxide from the carbon dioxide desublimator 5A (5B), the temperature of the dry ice needs to be increased at least to a triple point TP where the melting line ML, the vaporization line VL, and a desublimation line SL are crossed. However, before the temperature reaches the triple point TP, a certain amount of carbon dioxide gets gasified, and the thus gasified carbon dioxide cannot be liquefied depending on changes in the temperature under an isochoric state, resulting in loss of the carbon dioxide. To address this, the carbon dioxide desublimator 5A (5B) is preferably controlled as mentioned below in order to make this loss as less as possible.

After performing desublimation (solidification) of the carbon dioxide in the carbon dioxide desublimators 5A, 5B, heat pumps 52A, 52B (one example of a heating medium) of the carbon dioxide desublimators 5A, 5B are set at a temperature of the triple point or higher of the carbon dioxide. Thereby, inside the carbon dioxide desublimators 5A, 5B that have been cooled for desublimating (solidifying) the carbon dioxide is heated to liquefy the carbon dioxide which is in a form of the dry ice.

Then, heating by the heat pumps 52A, 52B are halted at the time when the temperature of the obtained liquefied carbon dioxide is in a range of minus 56.6 degrees centigrade to minus 50 degrees centigrade inclusive so that the liquefied carbon dioxide is collected with less loss.

The applicant has confirmed from experiments that the liquefied carbon dioxide can be recovered with less loss when the temperature of the liquefied carbon dioxide is in the range of about minus 50 degrees centigrade to 10 degrees centigrade. However, once the temperature of the carbon dioxide has reached the triple point, there is a possibility that the temperature suddenly goes higher from the triple point, resulting in an increase in the loss In response to this, heating is stopped at the time when the temperature is in the range of minus 56.6 degrees centigrade to minus 50 degrees centigrade inclusive so that the temperature of the liquefied carbon dioxide can be in the above-mentioned range of about minus 50 degrees centigrade to 10 degrees centigrade.

The timing of stopping heating by the heat pumps 52A, 52B may be the time when a pressure inside the carbon dioxide desublimators 5A, 5B becomes 518 kPa or more and 800 kPa or less. This pressure range corresponds to a range in the graph of FIG. 7 on the vaporization line VL in a range of minus 56.6 degrees centigrade to minus 50 degrees centigrade inclusive.

Further, it is preferable to start heating by the heat pumps 52A, 52B for recovering the liquefied carbon dioxide from the carbon dioxide desublimators 5A, 5B after the carbon dioxide is desublimated (solidified) until a ratio of a volume of the dry ice to a volume of the carbon dioxide desublimators 5A, 5B (hereinafter, referred simply as a volume ratio) is in a range of 0.1 to 0.3 inclusive. Thus, the liquefied carbon dioxide can be recovered with less loss.

FIG. 8 is a chart indicating a mass ratio of recoverable liquefied carbon dioxide and a mass ratio of gasified carbon dioxide (namely, a mass ratio of carbon dioxide that cannot be recovered and results in loss) with respect to a mass of the dry ice for each predetermined volume ratio in a case that the liquefied carbon dioxide is recovered under a condition (hereinafter, referred as a recovery condition) that the temperature of the liquefied carbon dioxide is minus 50 degrees centigrade and a pressure inside the carbon dioxide desublimators 5A, 5B is about 530 kPa.

For example, when the liquefied carbon dioxide is recovered under the above-mentioned recovery condition with a volume ratio of 0.12, the mass ratio of the recoverable liquefied carbon dioxide is 0.938 and the mass ratio of the gasified carbon dioxide is 0.062. Increase in the volume ratio from 0.12 causes increase in the mass ratio of the recoverable liquefied carbon dioxide, and accordingly, the loss is reduced. Then, when the liquefied carbon dioxide is recovered under the above recovery condition with the volume ratio of 0.3, the mass ratio of the recoverable liquefied carbon dioxide is 0.979 and the mass ratio of the gasified carbon dioxide is 0.021. In other words, after the carbon dioxide is desublimated (solidified) until the volume ratio is in the range of 0.1 to 0.3 inclusive, 90% or more than the mass of the dry ice can be recovered as the liquefied carbon dioxide as mentioned above.

Herein, the applicant has confirmed from experiments that the volume ratio less than 0.1 results in the mass ratio of the recoverable liquefied carbon dioxide as less than 0.9. The mass ratio less than 0.9 causes an increase in the loss by that amount, which is not preferable. Further, the applicant has confirmed from experiments that the volume ratio more than 0.3 results in a saturated state of the mass ratio of the recoverable liquefied carbon dioxide. If the carbon dioxide is to be desublimated (solidified) until the volume ratio becomes 0.3 or more, only the time required for desublimation (solidification) is increased while the mass ratio of the recoverable liquefied carbon dioxide is not increased, resulting in degradation in a recovery efficiency in the carbon dioxide, which is not preferable.

As mentioned above, in order to recover the liquefied carbon dioxide obtained in the carbon dioxide desublimators 5A, 5B, the open-close valves 17A (17B) of the take-out pipe 54A (54B) may be opened. Heating inside the carbon dioxide desublimators 5A, 5B causes increase in the pressure inside the carbon dioxide desublimators 5A, 5B, so that valve-opening of the open-close valves 17A, 17B leads to discharge of the liquefied carbon dioxide from the take-out pipe 54A (54B) by push-out of the pressure inside the carbon dioxide desublimators 5A, 5B.

Fifth Embodiment

Figure 9:
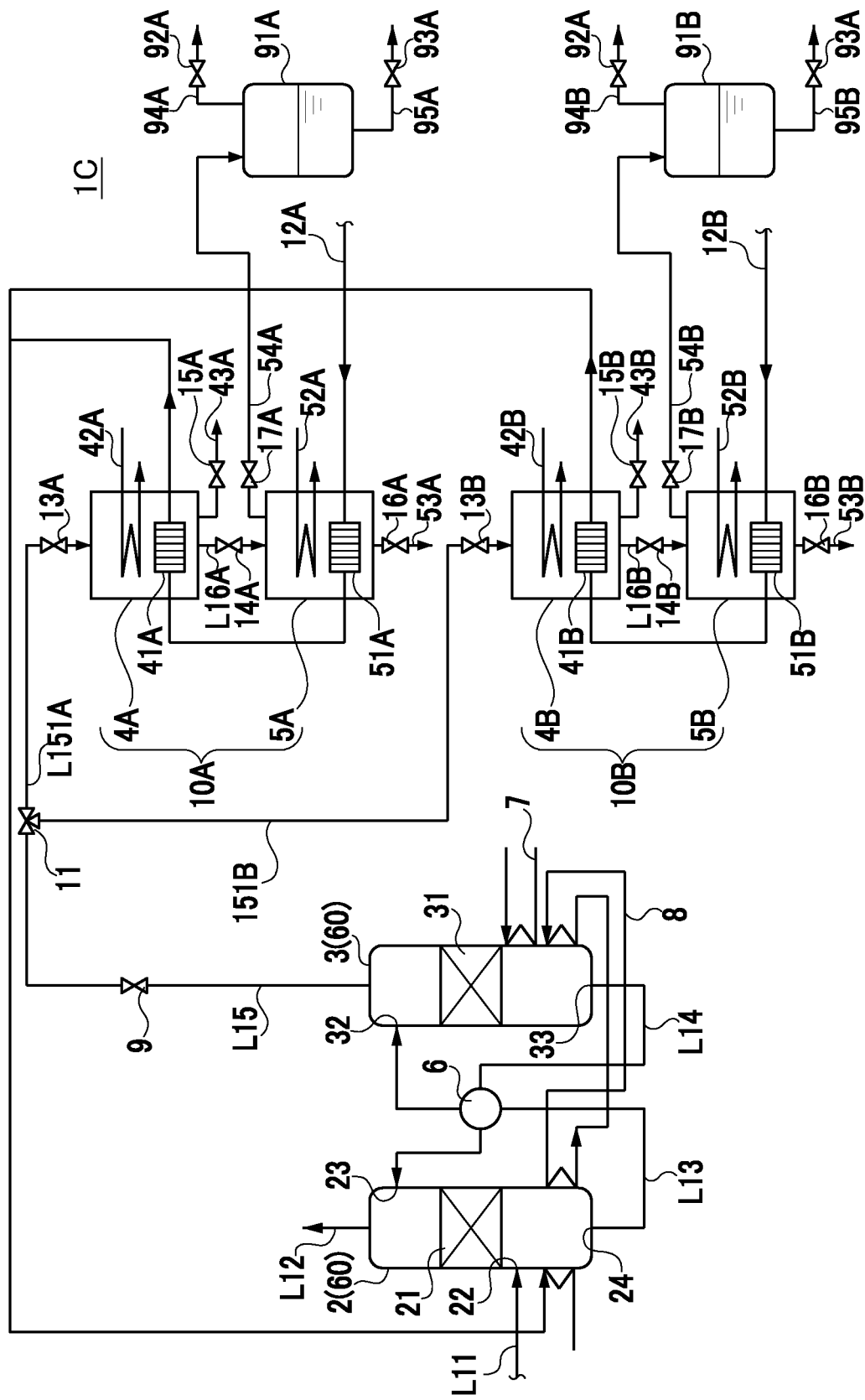
FIG. 9 is a schematic view showing a configuration of the carbon dioxide recovery device according to a fifth embodiment.

Further, when the liquefied carbon dioxide is to be recovered from the carbon dioxide desublimators 5A, 5B, like a carbon dioxide recovery device 1C according to a fifth embodiment shown in FIG. 9, for example, the carbon dioxide desublimators 5A, 5B may be connected with gas-liquid separators 91A, 91B, respectively. These gas-liquid separators 91A, 91B are, for example, devices configured to separate liquid and gas by use of a centrifugal force or surface tension and the like. The carbon dioxide recovery device 1C shown in FIG. 9 has the same configuration as the carbon dioxide recovery device 1A in FIG. 1 except the configuration that the gas-liquid separators 91A, 91B are connected to the carbon dioxide desublimators 5A, 5B. However, the configuration in FIG. 9 is only an example, and the gas-liquid separators 91A, 91B may be connected to the carbon dioxide desublimators 5A, 5B of any one of the carbon dioxide recovery devices 1B, 50A, 50B, 100A, and 100B.

When a gaseous body such as nitrogen that remains in a gas state at minus 162 degrees centigrade (the temperature of the above-mentioned cold heat) flows into the carbon dioxide desublimators 5A, 5B (hereinafter, explanation is made with nitrogen as one example), nitrogen remains in the gas state even under the temperature and pressure condition for receiving the liquefied carbon dioxide from the carbon dioxide desublimators 5A, 5B, so that the nitrogen could be discharged with the liquefied carbon dioxide when the liquefied carbon dioxide is to be output through the take-out pipe 54A (54B) of the carbon dioxide desublimators 5A, 5B. To address this, the gas-liquid separators 91A, 91B are connected to the carbon dioxide desublimators 5A, 5B so that the liquefied carbon dioxide and the nitrogen flow into the gas-liquid separators 91A, 91B from the take-out pipe 54A (54B), and thus the liquefied carbon dioxide and the nitrogen can be separated in the gas-liquid separators 91A, 91B.

To the gas-liquid separators 91A, 91B, gas discharge pipes 94A, 94B provided with open-close valves 92A, 92B are connected, and by opening the open-close valves 92A, 92B, the separated nitrogen can be discharged from the gas discharge pipes 94A, 94B. Further, to the gas-liquid separators 91A, 91B, liquefied-carbon-dioxide discharge pipes 95A, 95B provided with open-close valves 93A, 93B are connected, and by opening the open-close valves 93A, 93B, the liquefied carbon dioxide that has been separated from the nitrogen can be taken out from the liquefied-carbon-dioxide discharge pipes 95A, 95B.

Sixth Embodiment

Figure 10:
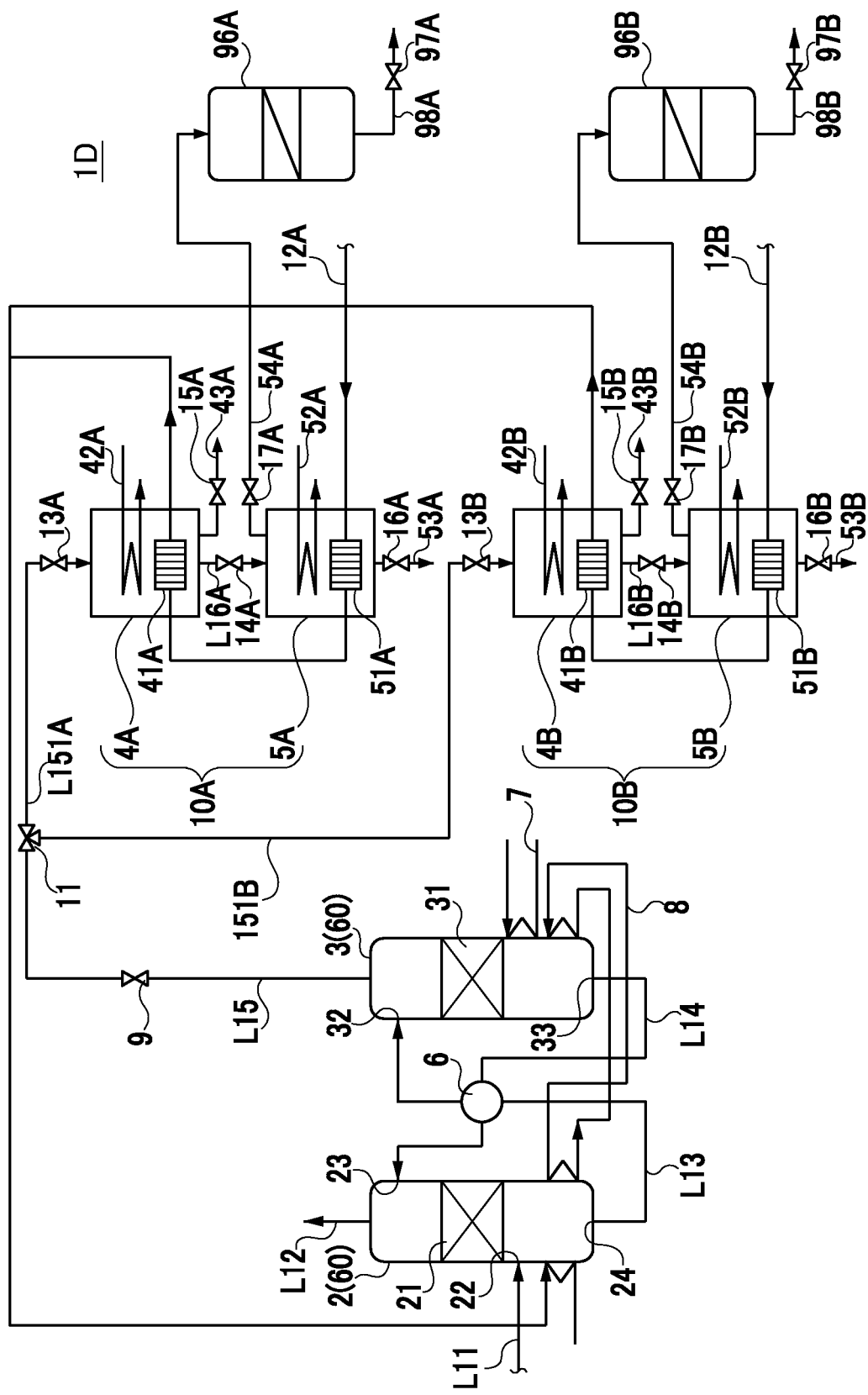
FIG. 10 is a schematic view showing a configuration of the carbon dioxide recovery device according to a sixth embodiment.

Furthermore, when carbon dioxide is to be recovered in a form of liquid, the carbon dioxide desublimators 5A, 5B may be connected with solid-liquid separators 96A, 96B as a carbon dioxide recovery device 1D according to a sixth embodiment shown in FIG. 10. These solid-liquid separators 96A, 96B are, for example, devices configured to separate liquid and solid by use of a sedimentation method, a centrifugation method, a compression method, a filtration method, and others. Herein, the carbon dioxide recovery device 1D shown in FIG. 10 has the same configuration as the carbon dioxide recovery device 1A shown in FIG. 1 except the configuration that the carbon dioxide desublimators 5A, 5B are connected with the solid-liquid separators 96A, 96B, respectively. However, the configuration shown in FIG. 10 is only one illustration, and the solid-liquid separators 96A, 96B may be connected to the carbon dioxide desublimators 5A, 5B of the respective carbon dioxide recovery devices 1B, 50A, 50B, 100A, and 100B.

When moisture is mixed in the carbon dioxide desublimators 5A, 5B in a process of obtaining liquefied carbon dioxide from dry ice, the moisture is solidified to turn ice depending on a temperature condition in recovering the liquefied carbon dioxide from the carbon dioxide desublimators 5A, 5B. This ice could be discharged with the liquefied carbon dioxide when the liquefied carbon dioxide is to be output from the take-out pipe 54A (54B) of the carbon dioxide desublimators 5A, 5B. To address this, the solid-liquid separators 96A, 96B are connected to the carbon dioxide desublimators 5A, 5B, respectively, such that the liquefied carbon dioxide and the ice flow into the solid-liquid separators 96A, 96B from the take-out pipe 54A (54B), and thereby the liquefied carbon dioxide and the ice can be separated in the solid-liquid separators 96A, 96B.

The solid-liquid separators 96A, 96B are connected with liquefied-carbon-dioxide discharge pipes 98A, 98B provided with open-close valves 97A, 97B, respectively, and the liquefied carbon dioxide that has been separated from the ice can be taken out from the liquefied-carbon-dioxide discharge pipes 98A, 98B by opening the open-close valves 97A, 97B.

Further, the above explanation has been made with a situation where the carbon dioxide desublimators 5A, 5B are connected with either the gas-liquid separators 91A, 91B or the solid-liquid separators 96A, 96B, but the carbon dioxide desublimators 5A, 5B may be connected with the gas-liquid separators 91A, 91B and the solid-liquid separators 96A, 96B in this order in series.

(Configuration of Carbon Dioxide Desublimator)

Figure 13:
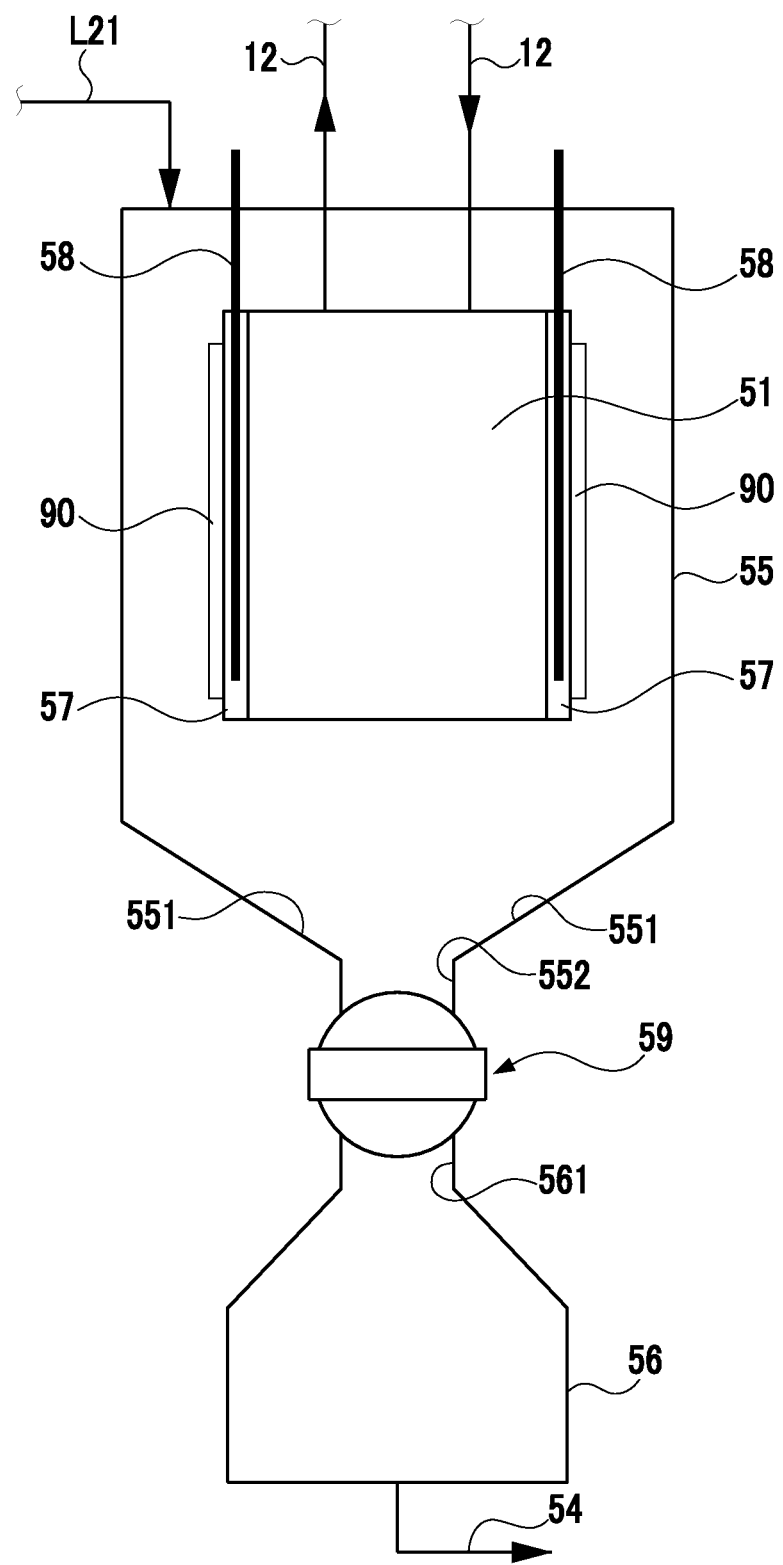
FIG. 13 is a view showing a configuration of a carbon dioxide desublimator.
Figure 14:
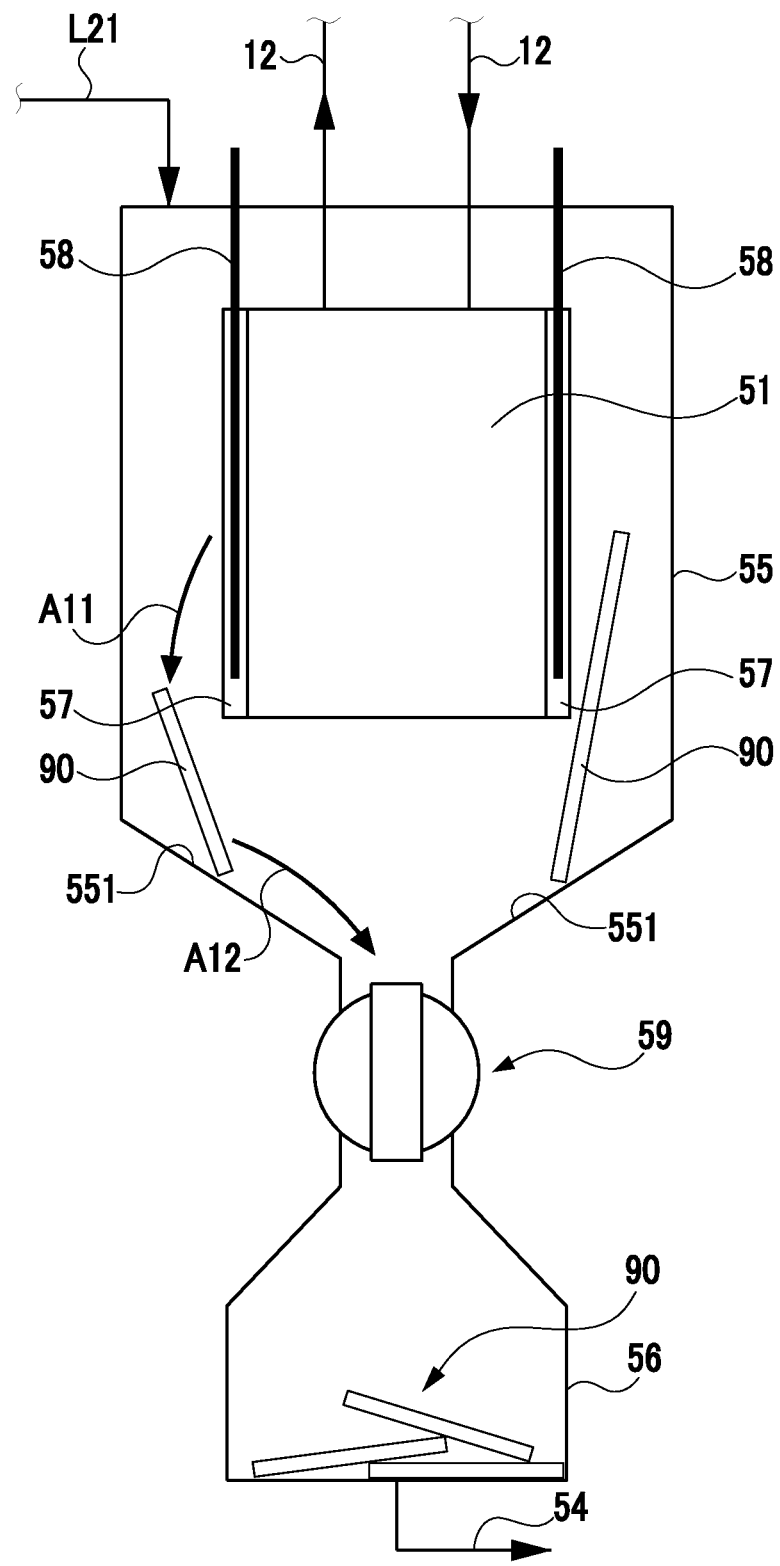
FIG. 14 is another view showing the configuration of the carbon dioxide desublimator.

The carbon dioxide desublimators 5A, 5B used for the above-mentioned carbon dioxide recovery devices 1A, 1B, 1C, 1D, 50A, 50B, 100A, and 100B may have a configuration as shown in FIG. 13 and FIG. 14. In FIG. 13, FIG. 14, and the following explanation, indication of the carbon dioxide desublimator is simply made as the carbon dioxide desublimator 5.

The carbon dioxide desublimator 5 is configured by coupling a desublimation chamber 55 for desublimating (solidifying) carbon dioxide and a recovery chamber 56 for recovering a dry ice 90 as the desublimated (solidified) carbon dioxide.

The desublimation chamber 55 is connected with a transfer pipe L21 to introduce the carbon dioxide to inside the desublimation chamber 55 from the transfer pipe L21. Herein, this transfer pipe L21 corresponds to any one of the second transfer pipes L16A, L16B in the carbon dioxide recovery device 1A (see FIG. 1), the branch transfer pipes L161A, L161B in the carbon dioxide recovery device 1B (see FIG. 2), the transfer pipes L15A, L15B in the carbon dioxide recovery device 50A (see FIG. 3), the second transfer pipes L16A, L16B in the carbon dioxide recovery device 50B (see FIG. 4), the branch transfer pipes L151A, L151B in the carbon dioxide recovery device 100A (see FIG. 5), the second transfer pipes L16A, L16B in the carbon dioxide recovery device 100B (see FIG. 6), the second transfer pipes L16A, L16B in the carbon dioxide recovery device 1C (see FIG. 9), and the second transfer pipes L16A, L16B in the carbon dioxide recovery device 1D (see FIG. 10).

The desublimation chamber 55 is arranged inside with a heat exchanger 51 connected to a refrigerant circuit 12. Thus, inside the desublimation chamber 55 can be cooled down to a temperature appropriate for desublimation (solidification) of the carbon dioxide. Herein, the temperature appropriate for desublimation (solidification) of the carbon dioxide is, as mentioned above, about minus 85 degrees centigrade or below when the combustion exhaust gas from an iron manufacturing plant or a cement plant is used as the to-be-separated gas, about minus 96 degrees centigrade or below when the combustion exhaust gas from the power plant is used as the to-be-separated gas, and about minus 140 degrees centigrade or below when the atmosphere is used as the to-be-separated gas. Further, an outer circumferential surface of the heat exchanger 51 is an attachment surface 57 (one example of an attachment portion) to which the dry ice 90 desublimated (solidified) in the desublimation chamber 55 is to be attached.

Further, the attachment surface 57 is connected with a heater 58. This heater 58 is for example, a cartridge heater. Operation of the heater 58 allows local heating of the attachment surface 57 of the heat exchanger 51. By heating the attachment surface 57, a surface contacted with the attachment surface 57 of the dry ice 90 which is attached to the attachment surface 57 can be desublimated (gasified). Thus, the dry ice 90 can be fallen off from the attachment surface 57.

The desublimation chamber 55 is provided with a first opening port 552 on an end portion on a side of the recovery chamber 56. Further, the desublimation chamber 55 is provided with a slant portion 551 constituting a downward slope toward the first opening port 552 between the heat exchanger 51 and the first opening port 552.

The recovery chamber 56 is provided with a second opening port 561 on an end portion on a side of the desublimation chamber 55. Then, the first opening port 552 of the desublimation chamber 55 and the second opening port 561 of the recovery chamber 56 are connected via a shut-off member 59. When the shut-off member 59 is brought in a closed state, inside the desublimation chamber 55 and inside the recovery chamber 56 are blocked (FIG. 13), and when the shut-off member 59 is brought in an open state, inside the desublimation chamber 55 and inside the recovery chamber 56 are in a communicated state (FIG. 14). The recovery chamber 56 is located below the attachment surface 57, so that once inside the desublimation chamber 55 and inside the recovery chamber 56 are communicated, the recovery chamber 56 can receive the dry ice 90 which is falling off the attachment surface 57. Further, the recovery chamber 56 is connected with a take-out pipe 54. This take-out pipe 54 is identical with the above-mentioned take-out pipe 54A (54B).

When the carbon dioxide desublimator 5 having the above-mentioned configuration is used, recovery of the carbon dioxide is performed as below.

Firstly, inside the desublimation chamber 55 is cooled by the heat exchanger 51 (the refrigerant flowing in the refrigerant circuit 12) to a temperature appropriate for desublimation (solidification) of the carbon dioxide. At this time, the shut-off member 59 is made to be in the closed state. While inside the desublimation chamber 55 is being cooled down, the carbon dioxide is introduced in the desublimation chamber 55 from the transfer pipe L21. The carbon dioxide introduced in the desublimation chamber 55 is desublimated (solidified) to be attached to the attachment surface 57 as shown in FIG. 13.

The heater 58 is operated while the dry ice 90 remains attached to the attachment surface 57, and thus the attachment surface 57 is heated to desublimate (gasify) the surface of the dry ice 90 to which the attachment surface 57 is attached. By this desublimation (gasification), the dry ice 90 attached to the attachment surface 57 is fallen off toward the slant portion 551 as indicated with an arrow A11 in FIG. 14 by the gravity. Then, the dry ice 90 having fallen to the slant portion 551 slides on the slant portion 551 toward the first opening port 552 as indicated with an arrow A12 by gravity. At this time, the shut-off member 59 is in the open state so that the dry ice 90 passes through the second opening port 561 from the first opening port 552 and then accommodated in the recovery chamber 56. The dry ice 90 accommodated in the recovery chamber 56 is desublimated (gasified) or liquefied and recovered from the take-out pipe 54. Herein, a casing of the recovery chamber 56 may be provided with a door or the like which is accessible to inside the recovery chamber 56 so that the carbon dioxide is recovered through that door in a form of solid.

Sublimation (gasification) of a contact surface of the dry ice 90 with the attachment surface 57 is enough for making the dry ice 90 fall from the attachment surface 57, and thus heating of the heater 58 may be made in a short time. Accordingly, the temperature of the desublimation chamber 55 that has been cooled to the temperature appropriate for desublimation (solidification) of the carbon dioxide does not have to be increased until the dry ice 90 is gasified or liquefied. In other words, a temperature changing range of the desublimation chamber 55 in recovering the dry ice 90 can be made small, and thus it is possible to suppress thermal impact applying to the desublimation chamber 55. Further, the thus small temperature changing range achieves suppression in loss of the cold heat and time which are required for cooling the desublimation chamber 55 in performing desublimation (solidification) of the carbon dioxide again in the desublimation chamber 55 after recovering the dry ice 90.

Herein, in each of the above-mentioned carbon dioxide recovery devices 1A, 1B, 1C, 1D, 50A, 50B, 100A, and 100B, the two carbon dioxide desublimators 5A, 5B are used (see FIG. 1. FIG. 2, FIG. 3, FIG. 4, FIG. 5, FIG. 6, FIG. 9, and FIG. 10). This is because while the one carbon dioxide desublimator 5A or 5B recovers the carbon dioxide that has been completed with desublimation (solidification), the other carbon dioxide desublimator 5A or 5B is made to perform desublimation (solidification) of the carbon dioxide, and thereby, recovery efficiency of the carbon dioxide can be improved.

However, if the carbon dioxide desublimator 5 shown in FIG. 13 and FIG. 14 is to be used, two desublimators do not necessarily have to be provided. As mentioned above, the carbon dioxide desublimator 5 can reduce the temperature changing range of the desublimation chamber 55 in recovering the dry ice 90, so that the subsequent desublimation (solidification) can be performed in a short time after the dry ice 90 is made to fall off the attachment surface 57, and thus the carbon dioxide can be efficiently recovered without using two desublimators.

The above-mentioned carbon dioxide recovery devices 1A, 1B, 1C, 1D, 50A, 50B, 100A, and 100B are only illustrations and have no any limitation to the present invention. Accordingly, the present invention can naturally be made with any improvements or modifications without departing from scope of the invention. For example, the features that the temperature of the water vapor condenser 4A (4B) is set to 1 degree centigrade, the carbon dioxide desublimator 5A (5B) is set at a temperature appropriate for desublimation (solidification) of the carbon dioxide, and the pressure of the separation device 70A (70B) is decompressed to about 4 kPa are only illustrations and the invention is not limited to those. For example, the temperature of the carbon dioxide desublimator 5A (5B) may be lower so that the carbon dioxide is made to turn dry ice more rapidly. However, if the temperature is lowered too much, there is contrarily a possibility of degradation in the recovery efficiency of the carbon dioxide since it is considered that when the carbon dioxide is to be recovered from the carbon dioxide desublimator 5A (5B), desublimation (gasification) of the dry ice takes time and the pressure of the regeneration tower 3 becomes too low, so that the adsorbent is in a coexistence state of liquid and solid, resulting in degradation in efficiency of diffusing the carbon dioxide. Accordingly, the temperature of the carbon dioxide desublimator 5A (5B) is appropriately adjusted in accordance with the recovery efficiency of the carbon dioxide.

REFERENCE SIGNS LIST

1A Carbon dioxide recovery device
60 Separation device
5A Carbon dioxide desublimator
5B Carbon dioxide desublimator
12A Refrigerant circuit
12B Refrigerant circuit

The invention claimed is:

1. A carbon dioxide recovery device comprising a separation device to separate carbon dioxide from to-be-separated gas including the carbon dioxide, wherein
the separation device and a carbon dioxide desublimator to desublimate (solidify) the carbon dioxide having been separated by the separation device are connected in series in order from an upstream side of supplying the to-be-separated gas,
the carbon dioxide desublimator is connected with a refrigerant circuit in which a fluid having cold heat is utilized as a refrigerant, and the carbon dioxide is desublimated (solidified) by the refrigerant, and
wherein the device is configured so that when the carbon dioxide is desublimated (solidified), the carbon dioxide desublimator is depressurized to be under negative pressure so that the carbon dioxide having been separated by the separation device is sucked.

2. The carbon dioxide recovery device according to claim 1, wherein
the separation device is provided with an absorption tower configured to bring to-be-separated gas including carbon dioxide and absorbing liquid for absorbing the carbon dioxide into gas-liquid contact to absorb the carbon dioxide by the absorbing liquid and a regeneration tower configured to emit the carbon dioxide with water vapor from the absorbing liquid that has absorbed the carbon dioxide,
the regeneration tower, a water vapor condenser configured to condense the water vapor having been emitted in the regeneration tower, and a carbon dioxide desublimator configured to desublimate (solidify) the carbon dioxide having been emitted in the regeneration tower are successively connected in series,
the water vapor condenser and the carbon dioxide desublimator are connected to a refrigerant circuit using a fluid having cold heat as a refrigerant, and the water vapor is condensed and the carbon dioxide is desublimated (solidified) by the refrigerant, and
the water vapor condenser and the carbon dioxide desublimator are depressurized to be under negative pressure when the water vapor is condensed and the carbon dioxide is desublimated (solidified), so that the water vapor and the carbon dioxide both having been emitted in the regeneration tower are sucked.

3. The carbon dioxide recovery device according to claim 2, wherein the refrigerant circuit is connected as being communicated with the carbon dioxide desublimator, the water vapor condenser, and the absorption tower, and the refrigerant flows through the carbon dioxide desublimator, the water vapor condenser, and the absorption tower in this order.

4. The carbon dioxide recovery device according to claim 2, wherein the regeneration tower is connected in parallel with at least two carbon dioxide recovery lines configured with the water vapor condenser and the carbon dioxide desublimator which are connected in series.

5. The carbon dioxide recovery device according to claim 2, wherein the regeneration tower is connected with one water vapor condenser, and the water vapor condenser is connected in parallel with at least two carbon dioxide desublimators.

6. The carbon dioxide recovery device according to claim 2, wherein a decompression valve is provided between the regeneration tower and the water vapor condenser.

7. The carbon dioxide recovery device according to claim 1, wherein the separation device storing an adsorbent to adsorb carbon dioxide is configured to separate carbon dioxide from the to-be-separated gas in a manner that the adsorbent adsorbs carbon dioxide included in the to-be-separated gas that has been supplied to the separation device.

8. The carbon dioxide recovery device according to claim 7, wherein
the separation device is configured to emit water vapor with the carbon dioxide,
the carbon dioxide recovery device includes a water vapor condenser to condense the water vapor,
the separation device, the water vapor condenser, and the carbon dioxide desublimator are connected in series in order from an upstream side of supplying the to-be-separated gas, and
the refrigerant circuit is connected to the water vapor condenser and the carbon dioxide, desublimator, and the water vapor is condensed and the carbon dioxide is desublimated (solidified) by the refrigerant.

9. The carbon dioxide recovery device according to claim 1, wherein
the separation device is provided with a permeable membrane to selectively transmit carbon dioxide, and the permeable membrane is configured to transmit carbon dioxide included in the to-be-separated gas that has been supplied to the separation device to separate carbon dioxide from the to-be-separated gas, and
the carbon dioxide desublimator is connected on a transmission side of the permeable membrane of the separation device.

10. The carbon dioxide recovery device according to claim 9, wherein
the separation device is configured to emit water vapor with the carbon dioxide,
the carbon dioxide recovery device includes a water vapor condenser to condense the water vapor,
the separation device (70A, 70B), the water vapor condenser, and the carbon dioxide desublimator are connected in series in order from an upstream side of supplying the to-be-separated gas, and
the refrigerant circuit is connected to the water vapor condenser and the carbon dioxide desublimator, and the water vapor is condensed and the carbon dioxide is desublimated (solidified) by the refrigerant.

11. The carbon dioxide recovery device according to claim 1, wherein
the to-be-separated gas is combustion exhaust gas from an iron manufacturing plant or a cement plant, and
the carbon dioxide desublimator is cooled down by the refrigerant to minus 85 degrees centigrade or below.

12. The carbon dioxide recovery device according to claim 1, wherein
the to-be-separated gas is combustion exhaust gas from a power plant, and
the carbon dioxide desublimator is cooled down by the refrigerant to minus 96 degrees centigrade or below.

13. The carbon dioxide recovery device according to claim 1, wherein
the to-be-separated gas is the atmosphere, and
the carbon dioxide desublimator is cooled down by the refrigerant to minus 140 degrees centigrade or below.

14. The carbon dioxide recovery device according to claim 1, wherein
the carbon dioxide desublimator is provided with a heating medium,
carbon dioxide is liquefied and recovered by heating inside the carbon dioxide desublimator to a temperature equal to or higher than a triple point of carbon dioxide by the heating medium, and
heating by the heating medium is to be stopped at a timing when a temperature of liquefied carbon dioxide is minus 56.6 degrees centigrade or more and minus 50 degrees centigrade or below or at a timing when a pressure inside the carbon dioxide desublimator becomes 518 kPa or more and 800 kPa or less.

15. The carbon dioxide recovery device according to claim 14, wherein the carbon dioxide desublimator is configured to desublimate (solidify) carbon dioxide until a volume ratio of the desublimated (solidified) carbon dioxide to a volume of the carbon dioxide desublimator is in a range of 0.1 to 0.3 inclusive.

16. The carbon dioxide recovery device according to claim 14, wherein the carbon dioxide desublimator is connected with a gas-liquid separator, and carbon dioxide is recovered from the carbon dioxide desublimator via the gas-liquid separator.

17. The carbon dioxide recovery device according to claim 14, wherein the carbon dioxide desublimator is connected with a solid-liquid separator, and carbon dioxide is recovered from the carbon dioxide desublimator via the solid-liquid separator.

18. The carbon dioxide recovery device according to claim 1, wherein
- the carbon dioxide desublimator is configured with a sublimation chamber to perform sublimation desublimation (solidification) and a recovery chamber to recover dry ice that is the desublimated (solidified) carbon dioxide,
- the desublimation chamber is provided inside with an attachment portion which is to be cooled down by the refrigerant and to be attached with the dry ice,
- the attachment portion is connected with a heater configured to heat the attachment portion and the dry ice attached to the attachment portion is made to fall down by operation of the heater, and
- the recovery chamber is positioned below the attachment portion to receive the dry ice that has fallen down from the attachment portion.

\* \* \* \* \*